May 27, 1941.  J. W. BRYCE  2,243,474
NUMBER COMPARING MEANS
Original Filed July 8, 1936  17 Sheets-Sheet 1
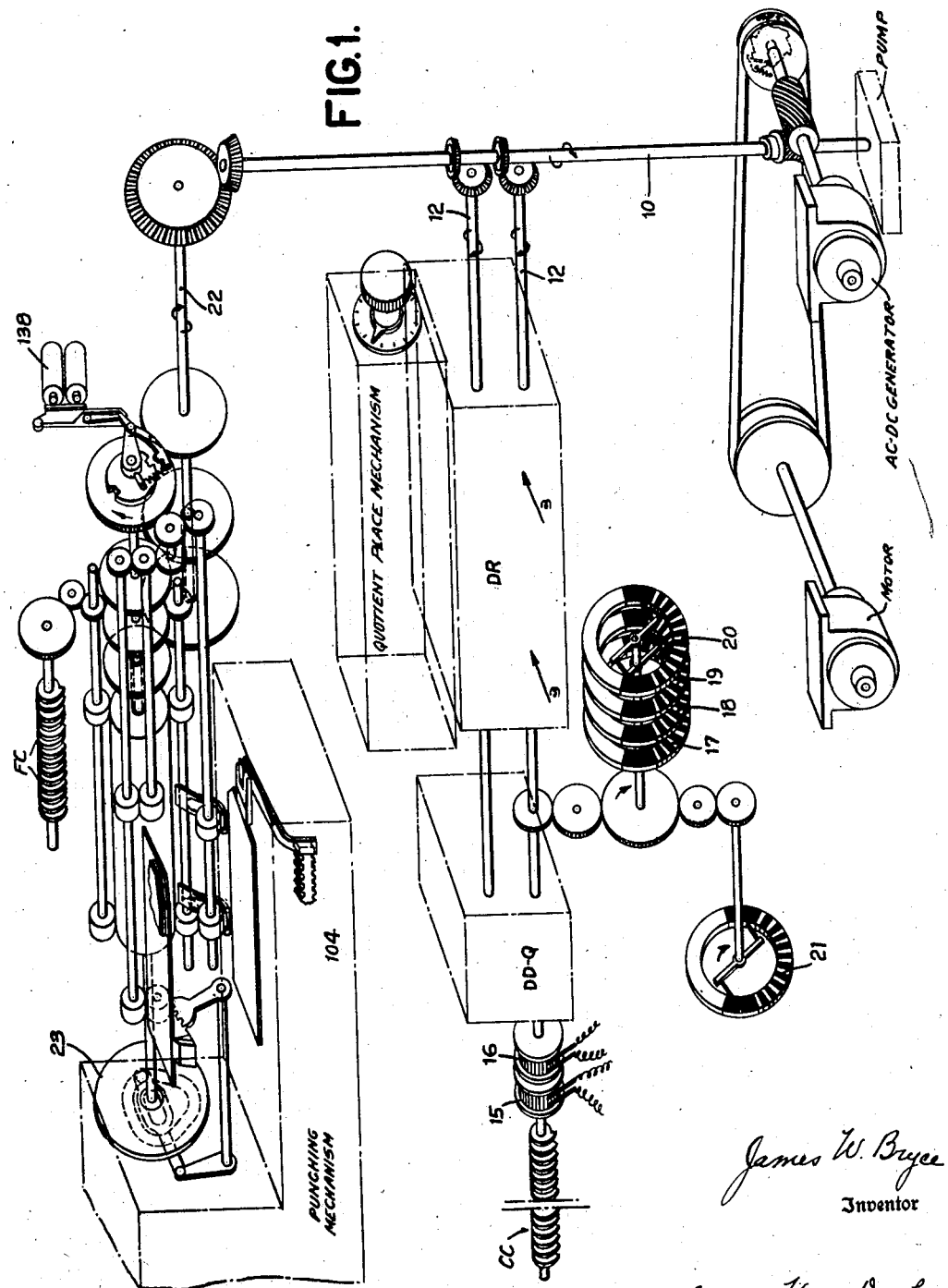
James W. Bryce
Inventor
Cooper, Kerr & Dunham
Attorneys May 27, 1941.  J. W. BRYCE  2,243,474
NUMBER COMPARING MEANS
Original Filed July 8, 1936   17 Sheets-Sheet 2
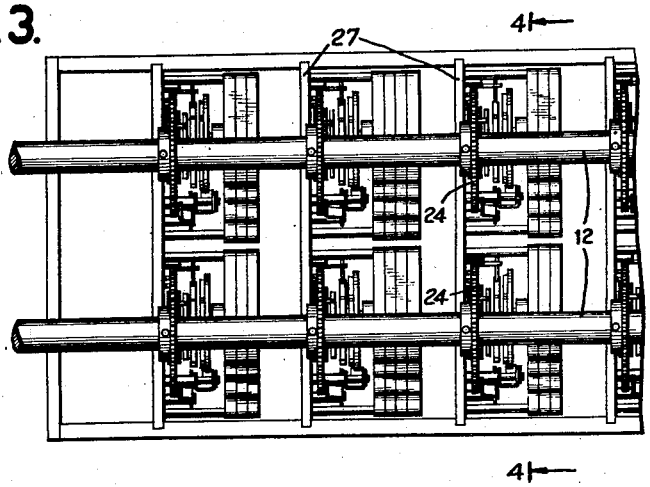
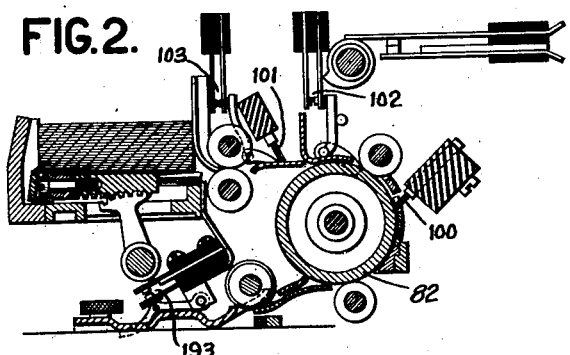
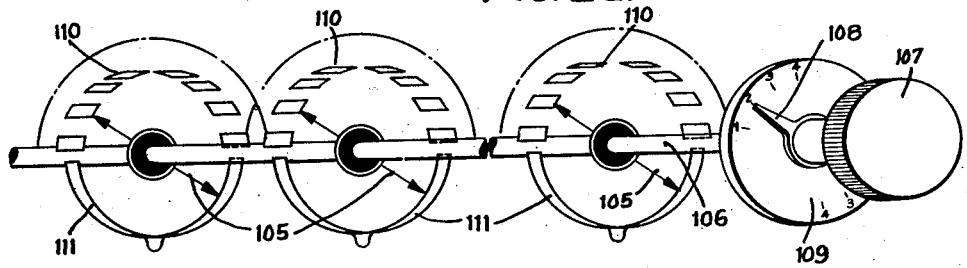
James W. Bryce
Inventor
Cooper, Kerr & Dunham
Attorneys May 27, 1941. J. W. BRYCE 2,243,474
NUMBER COMPARING MEANS
Original Filed July 8, 1936 17 Sheets-Sheet 4
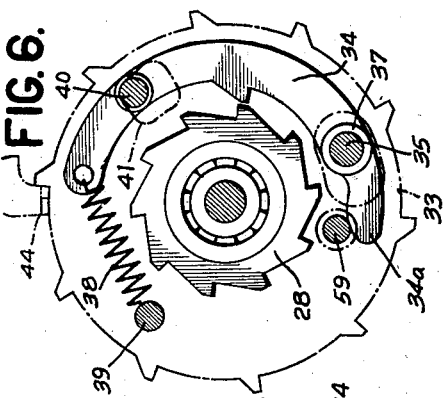
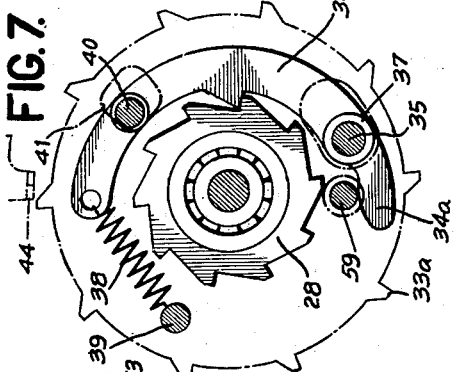
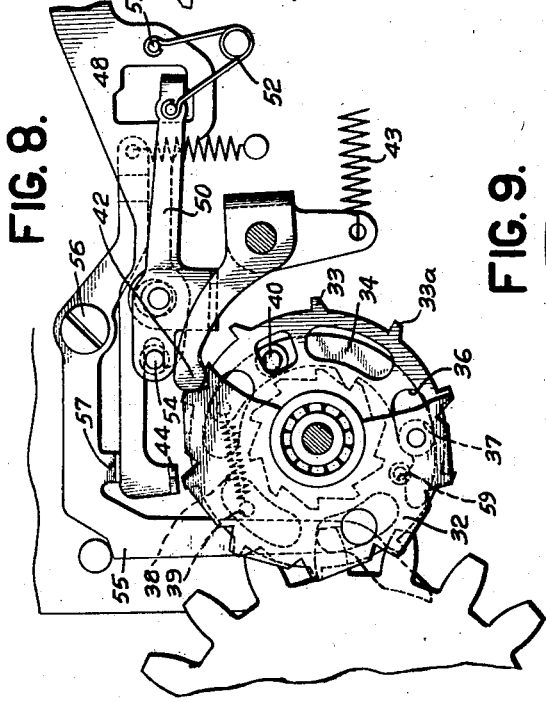
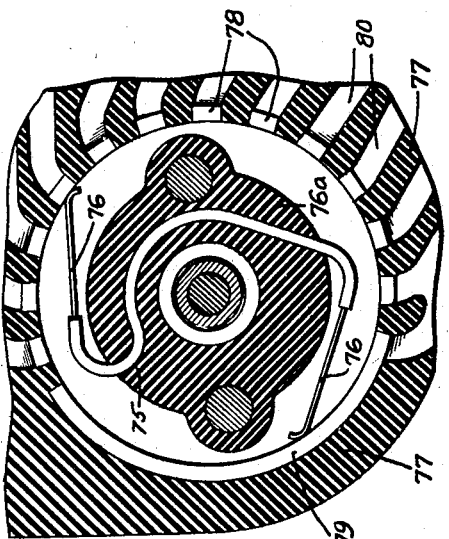
James W. Bryce
Inventor
Cooper, Kerr & Dunham
Attorneys May 27, 1941.　　　J. W. BRYCE　　　2,243,474
NUMBER COMPARING MEANS
Original Filed July 8, 1936　　17 Sheets-Sheet 5

Inventor
James W. Bryce
Cooper, Kerr & Dunham
Attorneys

May 27, 1941.   J. W. BRYCE   2,243,474
NUMBER COMPARING MEANS
Original Filed July 8, 1936   17 Sheets-Sheet 6

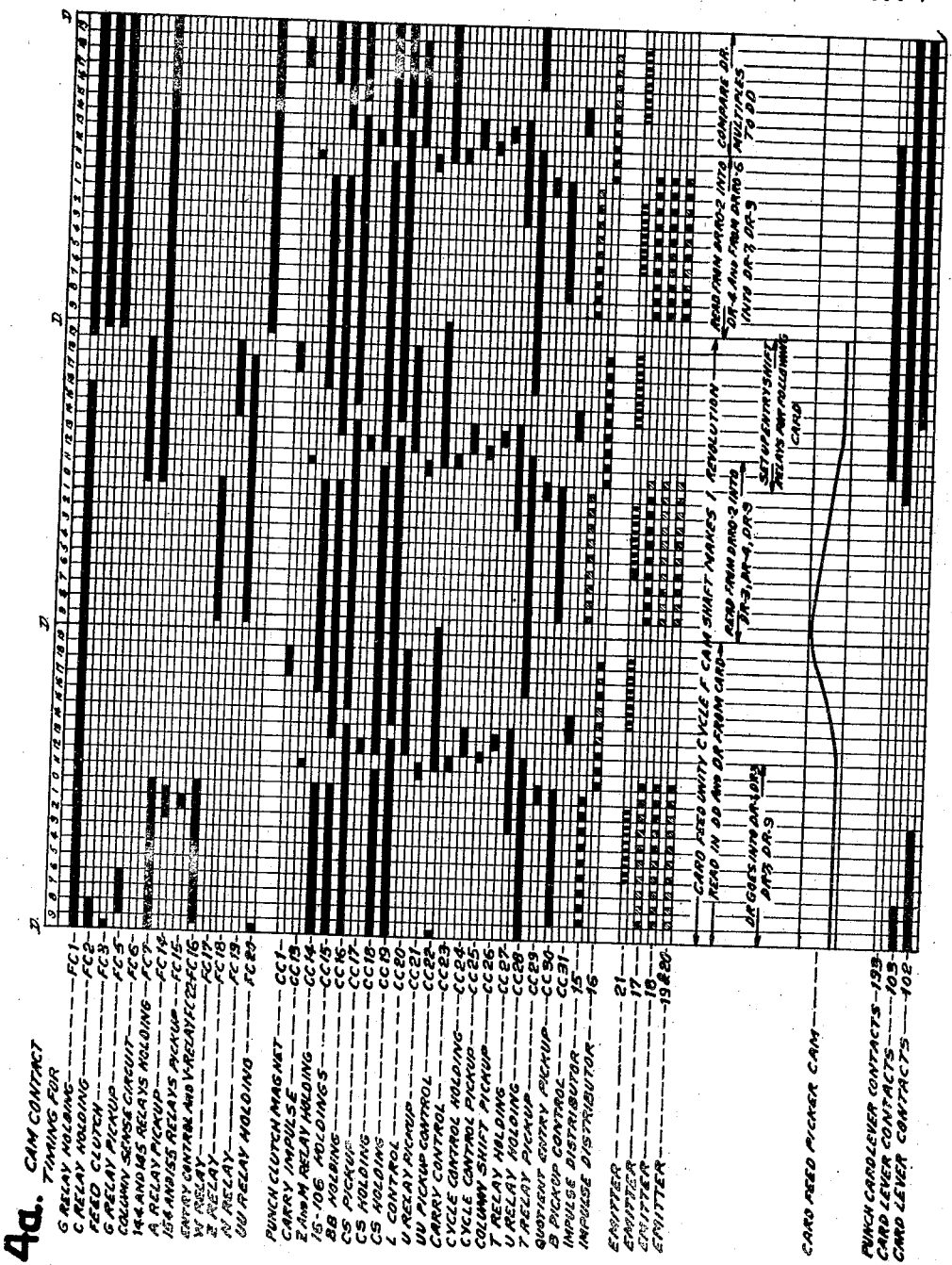

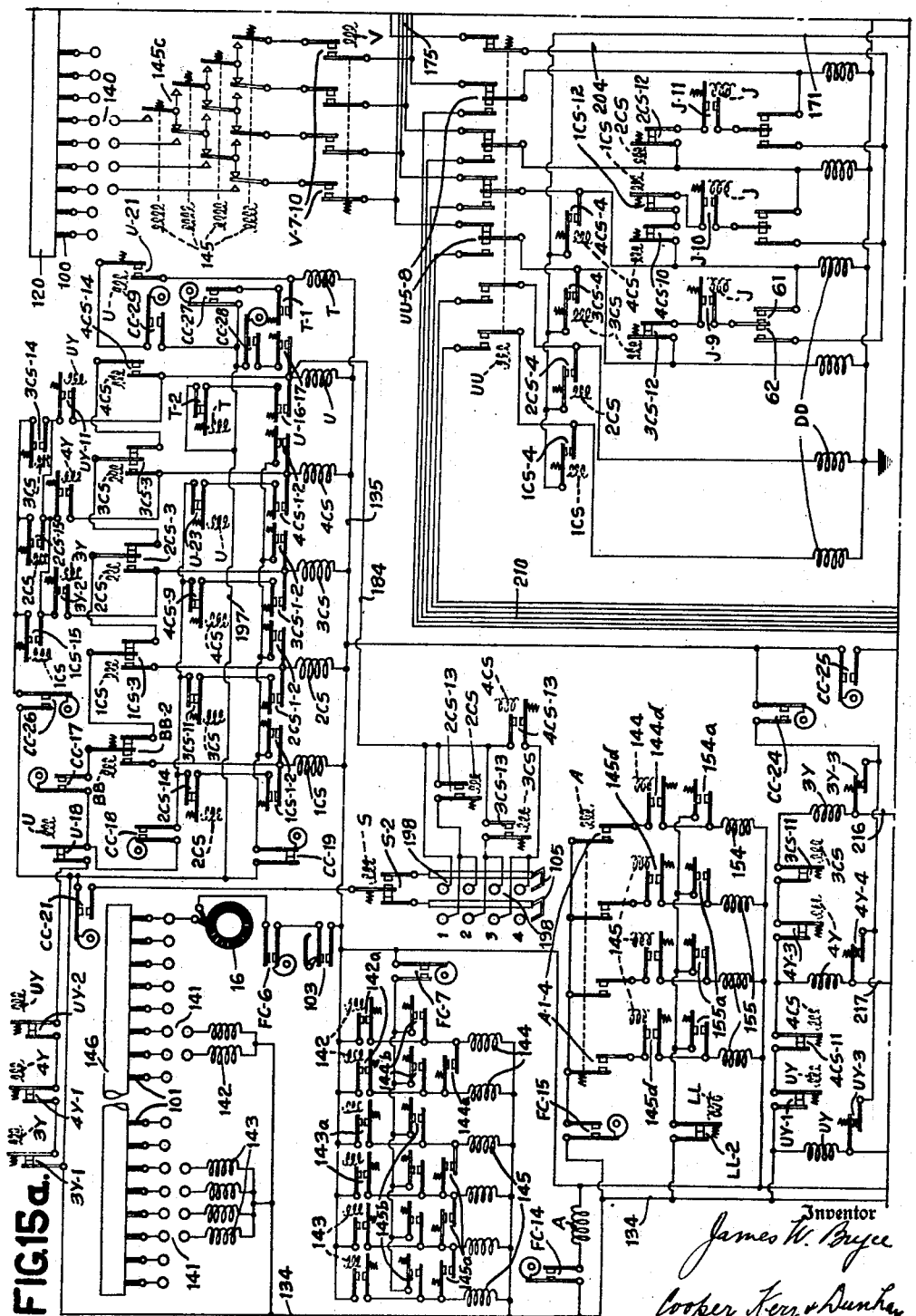

May 27, 1941.   J. W. BRYCE   2,243,474
NUMBER COMPARING MEANS
Original Filed July 8, 1936   17 Sheets-Sheet 12

Inventor
James W. Bryce
Cooper, Kerr & Dunham
Attorneys

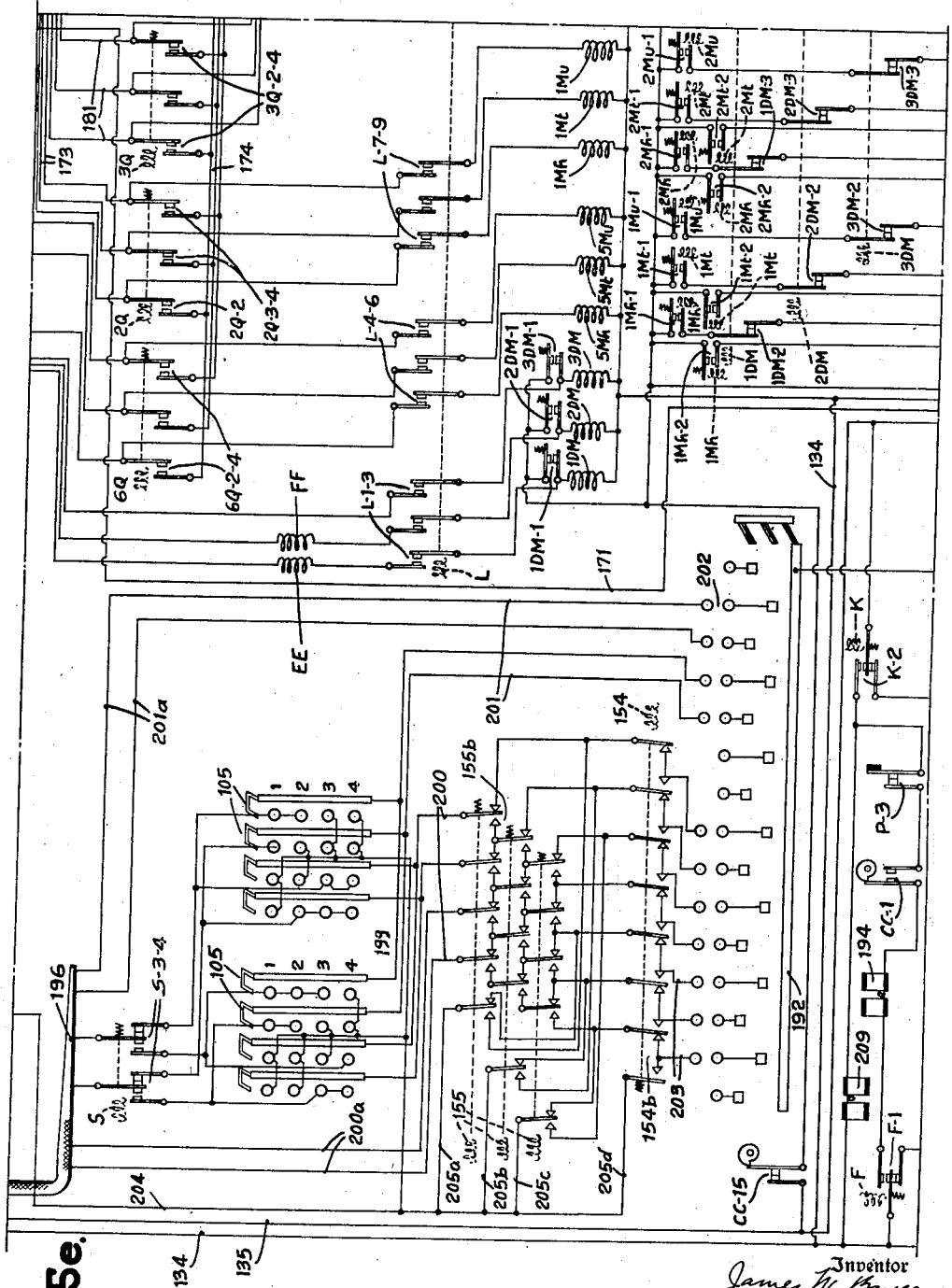

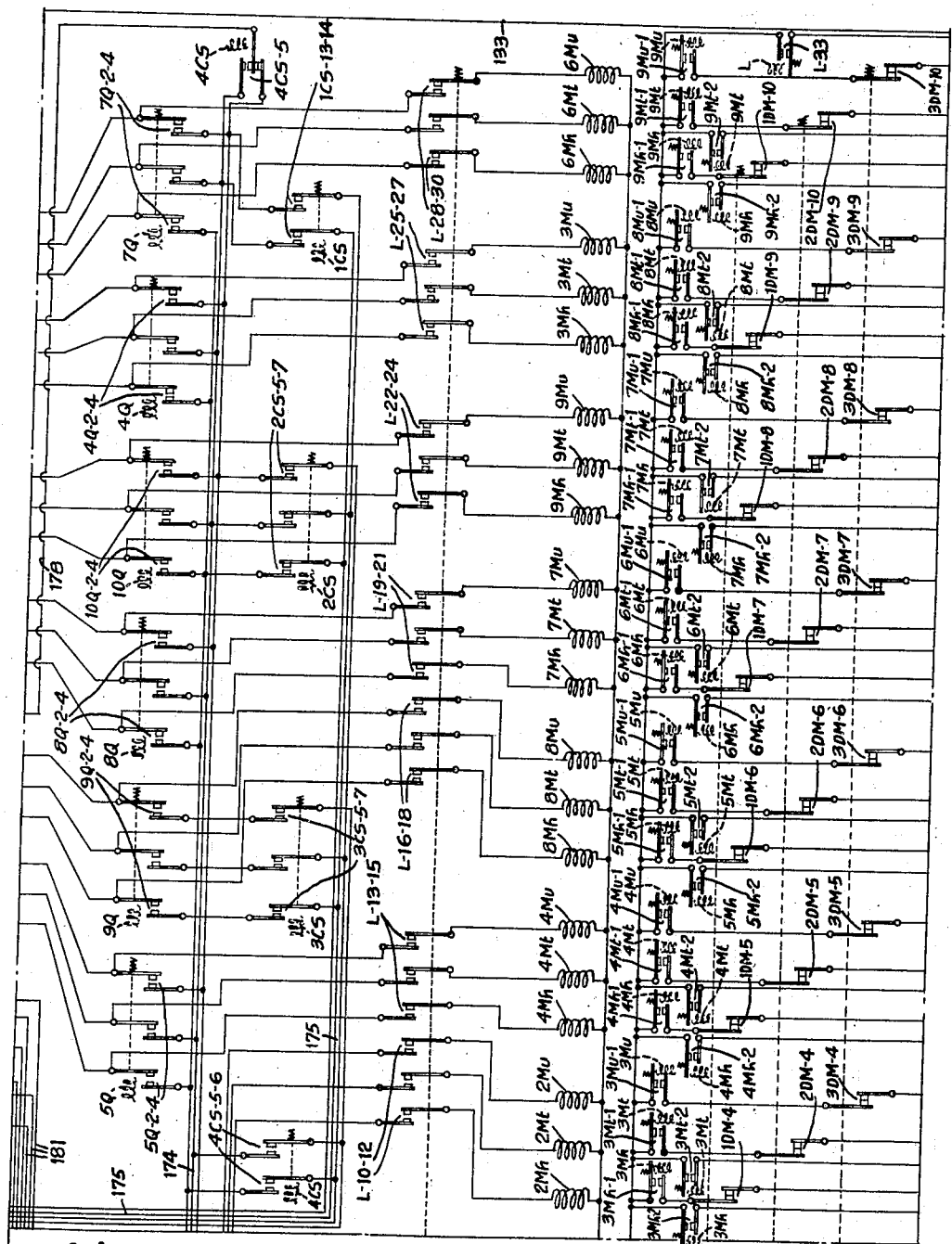

May 27, 1941.  J. W. BRYCE  2,243,474
NUMBER COMPARING MEANS
Original Filed July 8, 1936   17 Sheets-Sheet 15

FIG.15g.

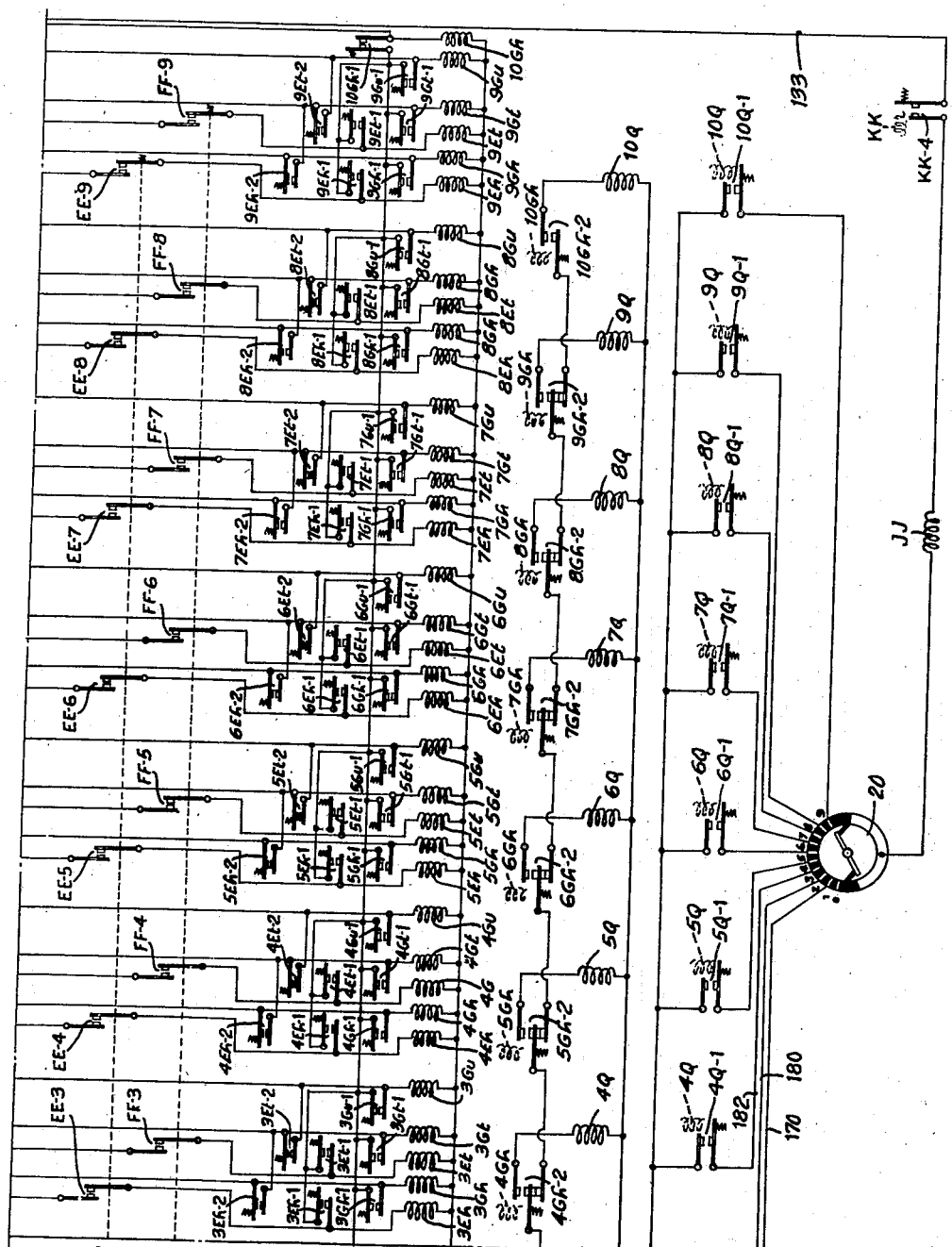

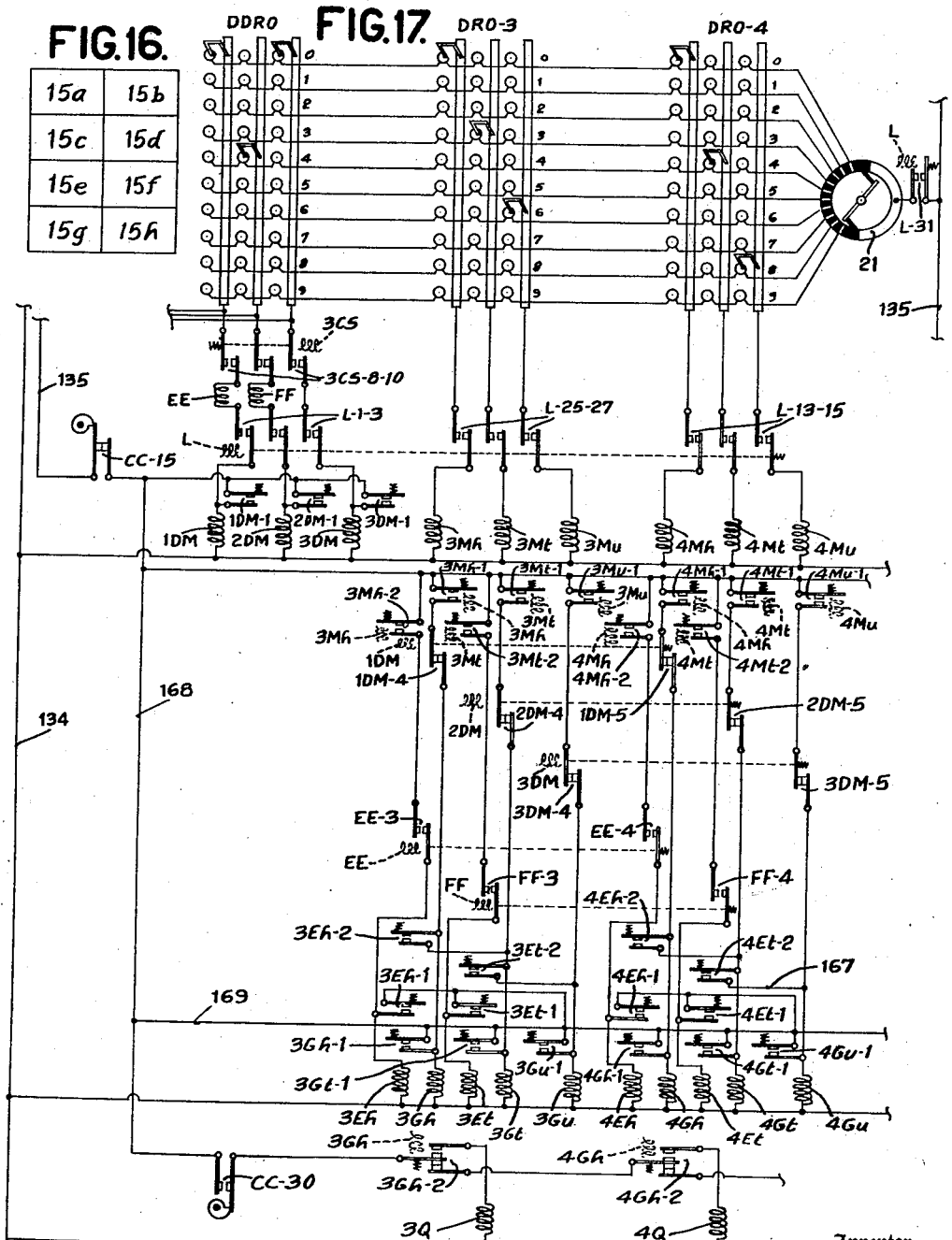

Patented May 27, 1941

2,243,474

UNITED STATES PATENT OFFICE 2,243,474

NUMBER COMPARING MEANS

James W. Bryce, Glen Ridge, N. J., assignor to International Business Machines Corporation, New York, N. Y., a corporation of New York Original application July 8, 1936, Serial No. 89,570. Divided and this application December 7, 1937, Serial No. 178,455

9 Claims. (Cl. 235—61.7)

This invention relates to comparing means adaptable for use in calculating machines, statistical machines, accounting machines, recording machines and the like.

In machine accounting, calculating, and recording, occasions frequently arise when it is desired to compare numbers to ascertain whether or not one number compares with another number as to magnitude and to ascertain how it compares. For example, assume two numbers are to be compared. It may be desired to ascertain whether one number is greater than, equal to or less than the other number. Comparing mechanism of various types has been utilized for such purposes. In certain instances, it is desired to extend the above mentioned simple comparing operation wherein two numbers are compared to a more complicated comparison wherein one number is to be compared with a plurality of other numbers, which other numbers are of different degrees of magnitude and to ascertain which number of the plurality of numbers is the greatest that is contained in the comparison number. Obviously, this type of comparison might be effected by utilizing a single comparing means, making it effective to first compare two numbers and then thereafter again compare one number with still another number and so on. This may be describeed briefly as successive comparison involving the use of a single comparing means which is repeatedly operated. Such form of comparison is obviously time consuming since the various comparing operations have to be made in succession one after the other.

The present invention has for its general objects the provision of an improved comparing means and mechanism adapted to concurrently compare one number with a plurality of other numbers.

A further object of the present invention resides in the provision of novel comparing means adapted to compare an amount upon an entry or amount receiving means concurrently with each of a plurality of other separate amounts upon other receiving means and to determine equal to, greater than, or less than conditions as between the first mentioned amount and each of the other amounts.

A further object of the present invention resides in the provision of means for concurrently comparing each of a plurality of amounts of a variable order of magnitude with another comparison amount and for ascertaining which one of the plurality of amounts of the least magnitude is greater than the comparison amount.

Further objects of the present invention reside in a novel comparing means of electrical type adapted to effect concurrent comparison, by concurrently effecting comparing operations.

A further object of the present invention resides in the provision of novel comparing means which have particular utility in dividing machines for automatically and by the operation of the machine comparing a dividend comparison portion with all possible multiples of the divisor to determine the highest going multiple of the divisor.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

The present application constitutes a division of my copending application, Serial No. 89,570, filed July 8, 1936, for Dividing machine.

In the drawings:

Figure 1 is a diagrammatic view showing the various units of the machine and the arrangement of driving mechanism;

Fig. 2 is a sectional view of the card handling and reading section of the machine;

Fig. 2a is a diagrammatic view of a portion of the quotient place limiting switching mechanism;

Fig. 3 is an elevational view of a section of the accumulating section of the machine which shows the manner of mounting the accumulator plate assemblies in the housing and the manner of drive for the accumulator mechanisms. The view is taken on line 3—3 of Fig. 4, looking in the direction of the arrows, see also Fig. 1.

Fig. 5 is a sectional detail view taken substantially on line 5—5 of Fig. 4, looking in the direction of the arrows; this view shows an accumulator gear element and also shows a sectional view of the associated readout mechanism;

Fig. 6 is a detail view of certain parts of the accumulator mechanism with the parts in normal position;

Fig. 7 is a similar view with the parts in operated position with the clutch engaged;

Fig. 8 is a view showing certain parts of Fig. 4 in operated position;

Fig. 9 is a sectional view of the readout mechanism, the section being taken substantially on line 9—9 of Fig. 5, looking in the direction of the arrows;

Figure 14B:
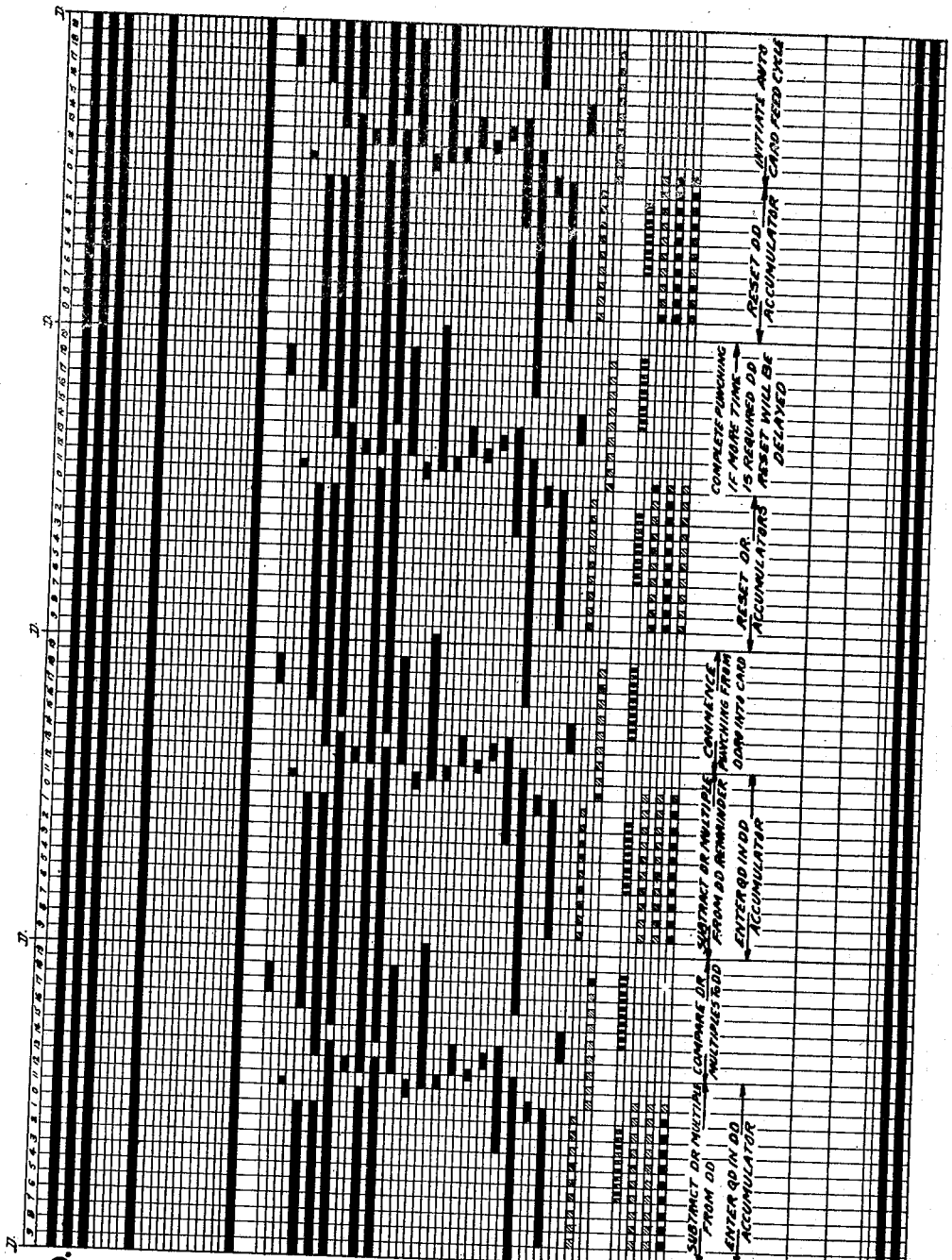

Figs. 14a and 14b, taken together with Fig. 14b to the right of Fig. 14a, show a timing diagram of certain parts of the machine;

Figs. 15a, 15b, 15c, 15d, 15e, 15f, 15g and 15h, taken together and arranged in the relation shown in Fig. 16, show the complete circuit diagram of the machine.

Fig. 17 is a fragmentary portion of the circuit diagram showing the manner in which the comparing operation is brought about and the manner in which the comparing devices effect a selective control of entries.

The novel comparing means which forms the subject matter of the present application, will be described and explained in connection with a machine for effecting division wherein said comparing means finds particular utility for expediting dividing operations. Before describing the division machine in detail and the comparing means utilized therein, a brief explanation will be given of the manner in which dividing operations are carried out by the machine.

Assume a dividend amount of 583 and a divisor amount of 11. These amounts are entered into suitable receiving devices of the machine. Following the entry of such amounts, multiples of the divisor are built up as follows: 11, 22, 33, 44, 55, 66, 77, 88 and 99. These amounts it will be understood, comprise all of the digital multiples of the divisor amount of 11. Following this building up operation the machine takes 58 which is the first comparison portion of the dividend amount of 583 and by a concurrent comparing operation concurrently compares 58 with each of the foregoing available divisor multiples. Upon such concurrent comparison, the divisor multiple of 55 is ascertained by the comparing means to be the highest going divisor multiple that is contained in the comparison portion of the dividend. Thereafter a deducting operation is effected and 55 is deducted from 583, deduction being effected as follows:

583
55
—
33

Concurrently, with the foregoing deducting operation the quotient amount of 5 is entered into the quotient receiving device. Following the deduction operation the machine again compares the remaining dividend comparison portion which is 33 with all of the different digital multiples of the divisor by a concurrent comparing operation and by such comparing operation the machine ascertains that the 33 multiple goes evenly into the dividend comparison portion of 33. In short, the comparing means in this operation ascertains that one number of the series is equal to the comparison portion of the dividend or comparison number. The machine then makes another entry of 3 for the quotient in the proper quotient place and effects another deduction of the amount of 33.

The foregoing simple explanation shows generally the mode of operation of the machine and the manner of use of the comparison mechanism in such machine.

Referring first to Fig. 1, the machine is shown as driven by a driving motor which, through the usual pulley and belt connections and ratchet drive, drives the A. C.-D. C. generator. Suitable worm gearing provides a drive for a vertical shaft 10, which by proper bevel gearing, drives two accumulator drive shafts 12. The calculating section of the machine comprises a divisor unit DR and a dividend and quotient unit DDQ. The divisor unit DR comprises five separate accumulators which will hereinafter be referred to as DR—1, DR—3, DR—4, DR—7 and DR—9. The suffix in each case indicates a multiple of the divisor. Thus DR—7 signifies that the ultimate amount in this accumulator is that of the divisor times 7. The DDQ unit comprises one large accumulator which is used for receiving both the entries of the dividend and quotient. Driven from the accumulator drive shaft 12, are impulse distributors 15 and 16 and this shaft also drives a number of CC cams for operating cam contact devices, there being twenty of such cams and cam contact devices in the instant machine. Also driven from the accumulator drive shaft 12 are a number of emitters, 17, 18, 19 and 20 and a supplemental emitter 21. The relation of drive is such that emitters 17 to 20 inclusive, emit one set of impulses for each revolution of the accumulator drive shaft 12 and emitter 21 emits two sets of impulses for each revolution of the accumulator drive shaft.

*Card handling, reading and punching section*

Suitable bevel gearing provides a drive for the main drive shaft 22 of the card handling, reading and punching unit. This section of the machine and the manner of drive is substantially the same as in the corresponding section of the machine shown and described in the United States patents to Cunningham, No. 1,933,714 and Oldenboom, No. 1,944,665 to which reference may be had for a fuller description of the general operation of the various units and the manner of drive.

In connection with this card handling, reading and punching unit it may be, however explained, that according to the instant machine the accumulating sections operate under a twenty point cycle. With this cycle of operation of the accumulating units there must be a delay in card feeding of four cycle points or index points so there is a slightly different timing of the picker cam 23. There is one additional modification in the card reading unit over the construction shown in the patents referred to. In lieu of utilizing a single X brush there are a complete row of brushes at the advance sensing station. The card handling unit also includes a number of FC cams for operating FC cam contacts. In the instant machine there are fourteen of these FC cams.

In lieu of utilizing the type of accumulator shown in the above mentioned Cunningham and Oldenboom patents, a different type of accumulator is utilized. In its main essentials, such accumulators are of the plate type arranged for slidable insertion in the machine and as is customary with this type of accumulators, two denominational orders are provided upon a single plate. Constructions of this type are shown in United States Patents Nos. 1,909,549 and 1,914,285 to J. R. Peirce. The specific accumulator utilized in the instant machine is substantially of the form shown and described in United States application to C. D. Lake, Serial No. 445,554, filed October 11, 1935.

Figure 4:
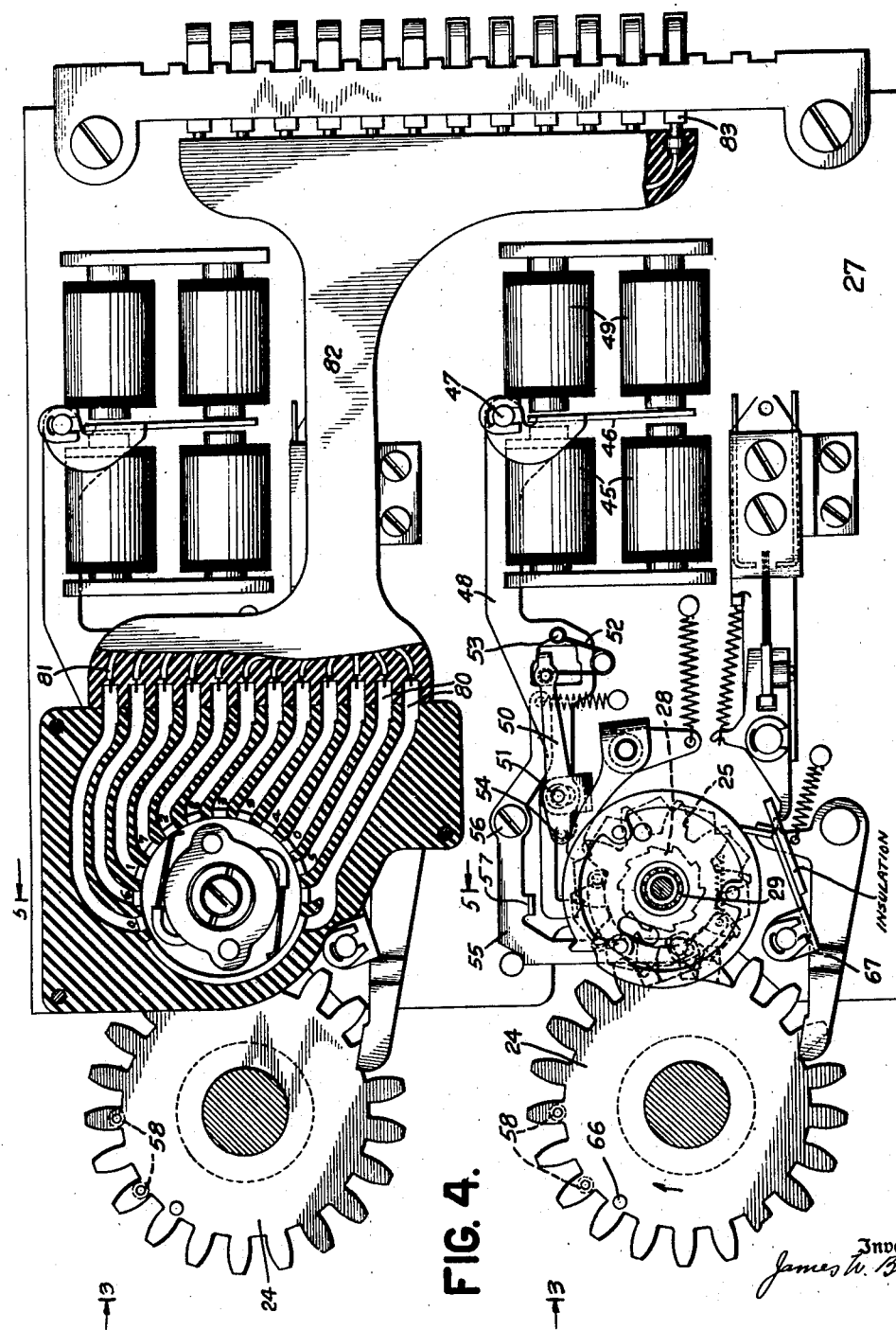
Fig. 4 is a sectional view of one of the accumulator plates, the section is taken substantially on line 4—4 of Fig. 3, looking in the direction of the arrows.

Referring now to Figs. 3 and 4, the accumulator drive shafts 12 carry and drive gears 24 which are in constant rotation. Meshing with each gear 24 is a gear 25 (see Figs. 4 and 10) which is freely mounted on a stud 26 secured in a plate 27. The plate 27, carries two of the gears 25 to provide for two denominational orders of an accumulating unit. As shown in Fig. 3, each of the plates 27 is slidably mounted in the supporting frame so that each plate can be withdrawn to de-mesh gears 25 from the driving gears 24 or replaced to enmesh the same therewith. In this manner, the plate 27 with the mechanism mounted thereon may be removed from the machine for repair or replacement.

As shown in Fig. 4, the gear 25 has staked or otherwise fastened thereto, a driving ratchet 28. The gear 25 and ratchet 28 are supported on a ball bearing 29 carried on stud 26 (see also Fig. 10). It will be understood with the counter plate in position the gear 25 and the ratchet 28 are in constant rotation. Also mounted on stud 26 and supported on the ball bearing 30 is a collar 31 which has rigidly secured thereto an accumulating disc 32 (see Fig. 5). The collar 31 also carries a ratchet 33 which is mounted for rotation upon the collar. The disc 32 carries a clutch pawl 34 which is pivoted upon the disc upon stud 35. It will be understood that the pawl 34 lies in the plane of the driving ratchet 28 and that the ratchet 33 lies between the pawl 34 and its supporting disc 32. The ratchet 33 is provided with an opening 36 through which the spacing sleeve 37 (see Figs. 6, 7 and 8) and its supporting pin extend. A spring 38 is connected to the upper end of the pawl 34 and has connection with a pin 39 carried by the disc 32. This pin 39 also extends through a suitable opening 39a in the ratchet 33. Secured on pawl 34 is a pin 40 which engages a camming surface 41 in ratchet 33. The relationship of the parts as shown in Fig. 6 where the pawl 34 is normally held out of engagement with the ratchet 28 is due to the action of camming surface 41 against the pin 40. If the ratchet 33 is permitted to move counterclockwise with respect to the pivot point of pawl 34 the camming surface 41 will move away from the pin 40 and permit the spring 38 of the pawl to rock the latter into engagement with the ratchet 28 so that the parts assume the relationship shown in Fig. 7.

The accumulating disc 32 is normally held by a detent arm 42 (Fig. 8) which is normally urged in a counterclockwise direction by spring 43. With the disc 32 thus restrained against movement, the tension of the spring 38 tends to cause the pin 40 to act against the camming surface and urge the ratchet 33 in a counterclockwise direction. The ratchet 33 is provided with teeth 33a which may be engaged by a latch and extension 44, of a lever 48 (see Figs. 8 and 6).

If the extension 44 is raised out of engagement with a tooth 33a, the ratchet 33 may then rock counterclockwise to permit the pawl 34 to move from the position of Fig. 6 to that of Fig. 7, thereby engaging the constantly rotating driving ratchet 28. Thereupon the accumulating disc 32 will be advanced until the pawl is again disengaged from the driving ratchet. This disengagement is brought about by lowering the extension 44 into the path of one of the teeth 33a, thus holding the ratchet 33 and causing its camming surface 41 to cam the pawl 34 out of engagement with the driving ratchet.

The initial elevation of the extension 44 to permit clutching of the accumulating disc is controlled by a pair of accumulator magnets 45, which upon energization attract an armature 46 (Fig. 4) pivoted at 47 so as to rock lever 48 clockwise. A second pair of magnets 49 is provided which also act upon the armature 46 to cause the rocking of the lever 48 in a counterclockwise direction. The lever 48 is provided with a toggle mechanism for maintaining the lever in either position. This toggle comprises a lever 50 pivoted at 51 to the plate 27 and comprising also a hairpin spring 52, one end of which is secured to the extremity of the lever 50 and the other end of which spring is secured to a pin 53 on lever 48. Lever 50 also has a pin and slot connection with the lever 48 at 54. Thus as the arm 48 is rocked clockwise under the control of the magnets 45, the pin and slot connection will cause the lever 50 to rock clockwise, throwing the toggle 50—52 across dead center to the position shown in Fig. 8, in which position the parts will be held by the spring 52 until the lever 48 is rocked back to its initial position. This return rocking of the arm 48 may be effected by the magnet 49 or it may be mechanically brought about by the counterclockwise rocking of a member 55 which is pivoted at 56 and which member has a lateral extension 57 extending above the end of the lever 48. The member 55 has its depending arms lying in the paths of pins 58 which are carried by the driving gear 24 (see Fig. 4). As the pins pass the end of the member 55, the latter is rocked counterclockwise and through its extension 57 (Fig. 8) will depress the arm 48 to cause disengagement of the clutching devices. It will thus be seen that the accumulating disc 32 may be clutched to the driving ratchet when the magnets 45 are energized and de-clutching will take place upon the energization of magnets 49 or under the mechanical action of either of the pins 58 upon gear 24.

Figure 10:
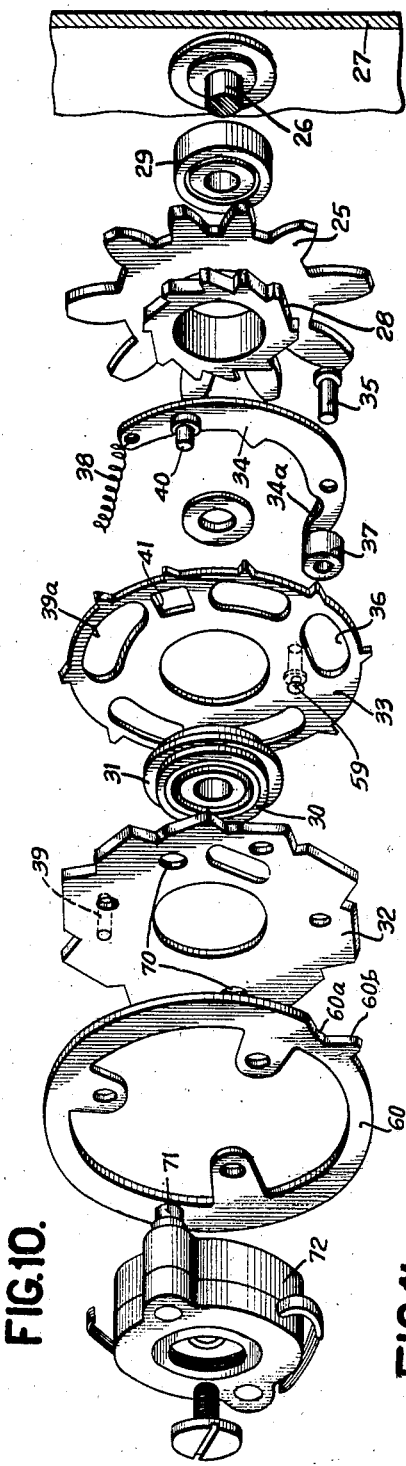
Fig. 10 is an exploded view of the separate elements accumulator and a brush assembly.

Referring now to Figs. 6 and 7, the pawl 34 is provided with a tail 34a which lies in the path of pin 59 which pin is carried by the ratchet 33 (see also Fig. 10). The cooperation of tail 34a of the pawl with the pin 59 provides for the locking of the elements in their various positions, particularly under the influence of inertia effects when the device is operated at high speed. As seen in Fig. 7, the relative location of the pin and tail are as shown, and upon engagement of the pawl 34 with the driving ratchet 28a, the pin 59 will have shifted to a position where the pawl 34 is locked in position and cannot move out of engagement with the ratchet until the pin 59 is rocked back to its initial position.

The disc 32 has fixedly secured to it an annular element 60 (Fig. 10) provided with a depression 60a in its periphery and with a projecting tooth 60b. The arrangement is such that while the accumulator disc 32 reaches the 9 position, an extension of a lever 63 pivoted at 64 will be in cooperation with the depression 60a and will permit a supplemental lever 65 to assume the position shown in Fig. 11 so that a transfer brush 65a will make contact at 61. Such shifting movement is effected by means of a spring 65b. When the annular member 60 passes from the 9 to 0 position the carry tooth 60b will rock the lever 63 clockwise and shift member 65 counterclockwise to cause the establishment of a contact between the transfer brush 65a and the contact 62.

Figure 11A:
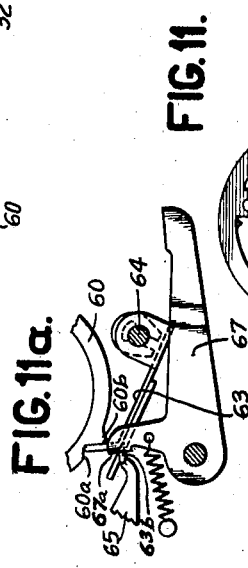
Figs. 11a and 12a are details of latching mechanism for the transfer brush.
Figures 12, 12A:
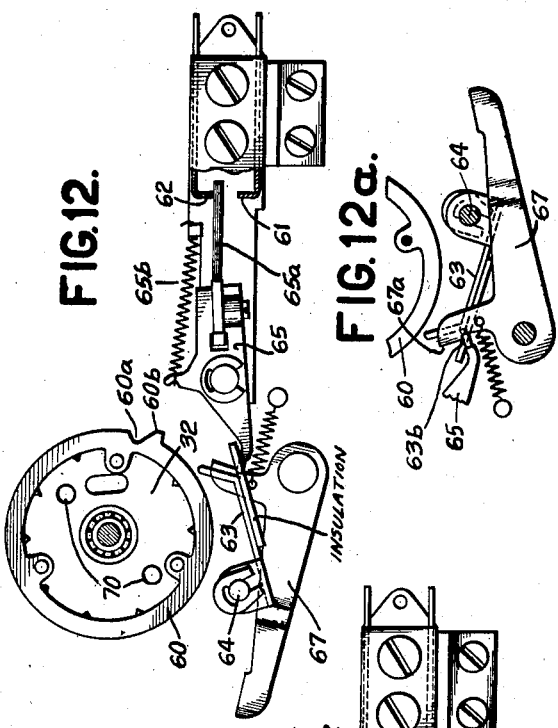
Figs. 11 and 12 are detail views showing the manner in which the carry mechanism operates, Fig. 11 showing the relation of parts with the accumulator elements in nines position and Fig. 12 showing the relation of the parts after the accumulator wheel has passed from 9 through the zero position and before restoration of the carrying mechanism.
Figure 11:
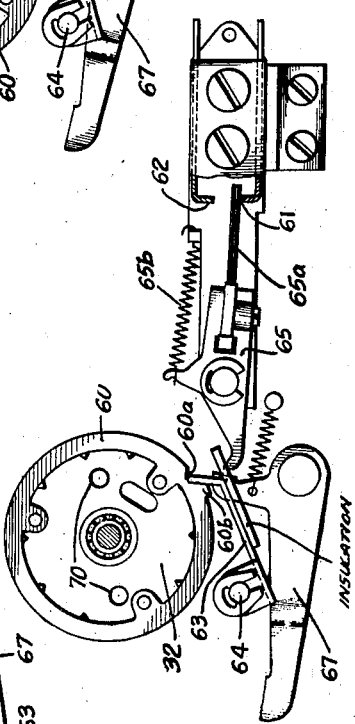

The transfer brush holder 65 is held in its counterclockwise shifted position by a latching means 67 which includes a latching extension 67a (see Fig. 12a) which engages a lateral extension 63b from member 63. Fig. 11a shows the parts in an unlatched condition and Fig. 12a shows the parts latched. The latching means and the member 65 is restored to normal midposition, i. e. the position of Fig. 4, by a pin 66, on gear 24, abutting a lever 67 and rocking such lever in counterclockwise direction.

As is customary in machines of this class, if a 9 is to be added, the circuit to the magnet 45 is completed at the 9 time and the disc 32 is rotated through nine steps at which time the leading pin 58 will cause disengagement of the clutch. If the magnet 45 had been energized in response to a 3 index perforation the clutch engagement would take place at the 3 time and there would be disengagement by the leading pin 58 after three steps of movement. Thus upon adding the time of clutch engagement is variable and the knockout or disengagement occurs at a fixed point in the cycle. Carry out operations take place at appropriate times under the control of the contacts 61 or 62 to add a unit into the appropriate higher orders.

According to the present invention subtracting operations as such are not employed and no further description need be given of the manner of operating the accumulator magnets for subtracting purposes.

*Readout mechanism*

In lieu of the total printing control shown in the Lake application above described, a new form of readout is here employed. Such readout and the accumulator herein described, form the subject matter of a separate application of C. D. Lake, Serial No. 84,677, filed June 11, 1936.

Referring to Figs. 10 and 5 it will be seen that the accumulator element 32 is provided with a pair of openings 70. Such openings receive studs 71 to provide a drive for the brush assembly of the readout. The studs 71 are preferably molded in a block of insulating material 72, which block of insulating material is disposed upon a sleeve 73 which is rotatable upon fixed stud 26. The extended ends of the studs 71 beyond the block 72 extend through one or more of a plurality of insulating brush holder blocks 74. Any number of such brush holder blocks may be provided depending upon the number of sections which the readout is to have.

Referring to Figs. 5 and 9, it will be noted that each brush holder 74 is provided on one of its faces with a brush receiving slot 75. The intermediate part of each brush 76a is shaped to fit the slot and the brush proper 76 extends beyond the periphery of the brush holder and into cooperation with a suitable track containing readout segment blocks. The readout proper comprises an insulating molding 77 with readout segment portions 78 and common segment 79. The segment blocks are provided with integral extensions 80 which extend through the molding 77 and at a point beyond the molding provide connecting terminals to which wires 81 may be attached (see Fig. 4). The wires 81 may be soldered or otherwise secured to the ends of parts 80 and such wires may be molded in a somewhat flexible rubber molding 82 which extends to terminal contact points 83 at the back edge of the plate.

Referring again to Fig. 5, the outermost brush holder 74a (i. e. the one at the extreme left) is provided with a recess 84. The outer end of sleeve 73 is threaded to receive a holding collar or nut 85 which holds brush holder 74a in place and all other brush holders to the right. A cap stud 86 secures the readout assembly against endwise movement with respect to studs 26.

On Fig. 4 the leads 80 have been correspondingly numbered to correspond to the values of the readout contact positions. It will be noted that the readout blocks do not follow a consecutive number relation, but there is an interspersing of numbers. In this respect, the readout arrangement is substantially that shown in the Daly application, Serial No. 632,529, filed Sept. 10, 1932.

It may be explained that the readout segment spots are spaced at 18 degree intervals. The brush mechanism, during one index point of movement, however, traverses 36 degrees of movement. The two ends of the brush shown in Fig. 9 are likewise not disposed 180 degrees apart, but are disposed 18 degrees out of the 180 degree phase. With this timing and annular relation, it is necessary to place consecutive spots 36 degrees apart, instead of 180, which is the relation indicated in Fig. 4. With the readout shown, there is a separate double pair of zero spots and with this arrangement when desired, the zero spots may be used in independent circuits or one of them may be exteriorly wired in common with the common segment.

Inasmuch as the present machine utilizes accumulators of the previously described type, no mechanical resetting means is necessary. All reset is effected electrically as is customary in accumulators of this class.

Referring further to Fig. 1 and as stated before, the card handling and sensing section of the machine is generally the same as in the Cunningham patent above referred to. The usual reading or sensing brushes are shown, being designated at 100 (see Fig. 2). A supplemental set of pre-sensing or advance sensing brushes are shown which are designated 101. This set of brushes comprises a complete set of brushes which extend completely across the record card. There is also provided card lever contacts 102. Supplemental card lever contacts 103 are also provided which come into action in advance of the other or regular card lever contacts 102.

Complete details of the punch are not herein shown as they are substantially the same as the punch described in the Cunningham or Oldenboom patents. A fragment of the punch is, however, shown on Fig. 1 at 104 and this same figure shows a record card in the entering section of the punch. The dotted line structure represents the punching mechanism of the aforesaid patents.

Readouts

Figure 15B:
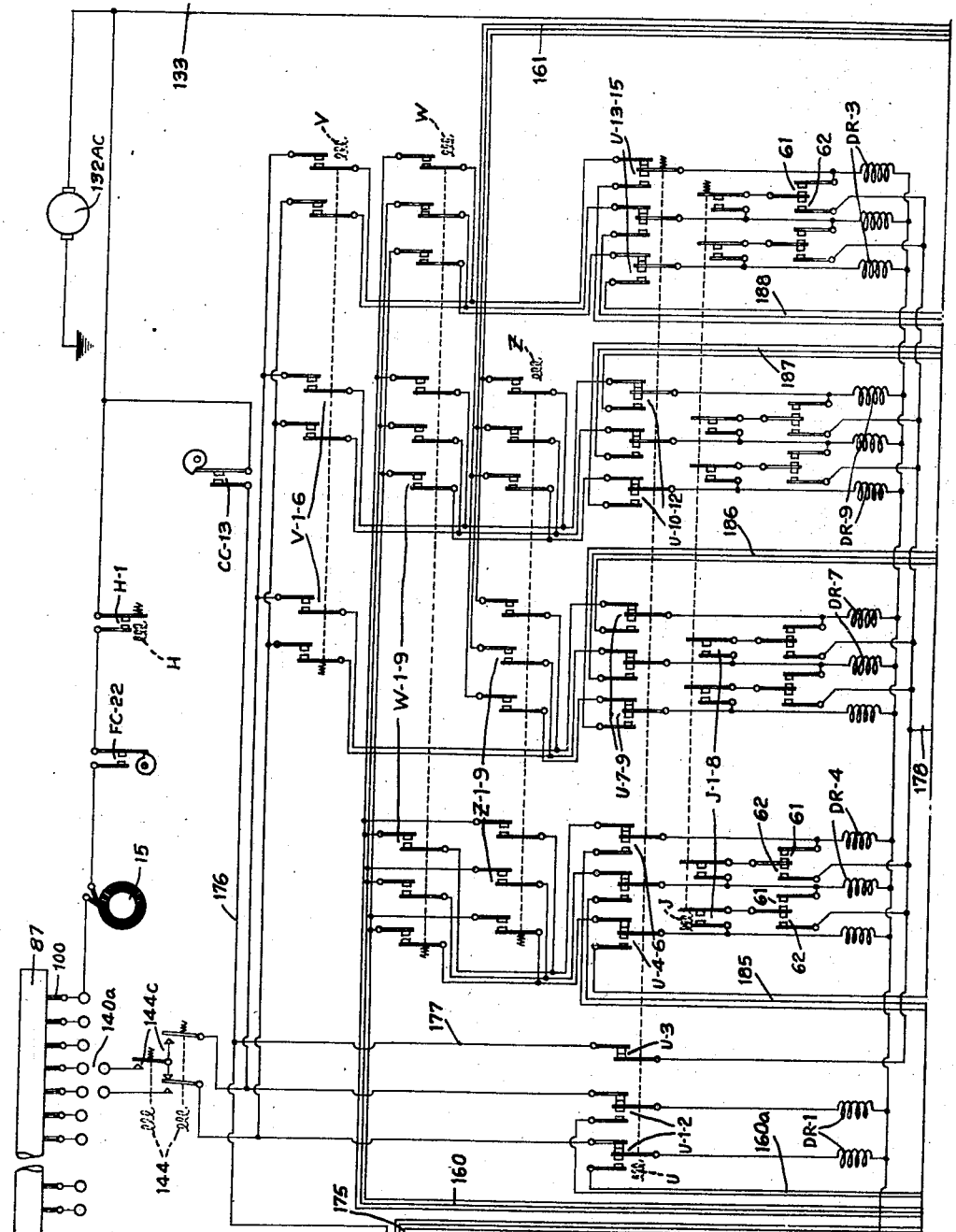
Figure 15C:
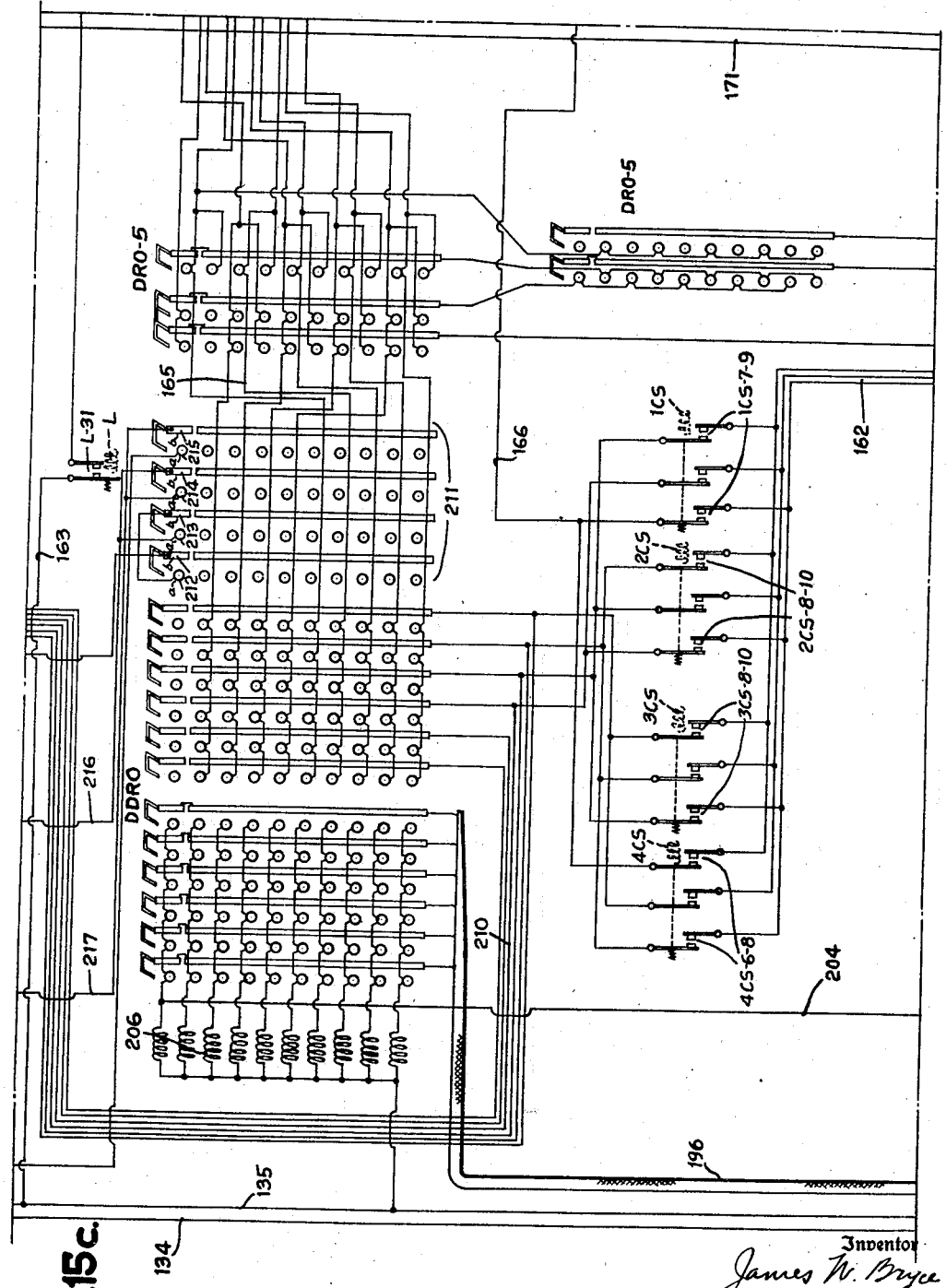
Figure 15D:
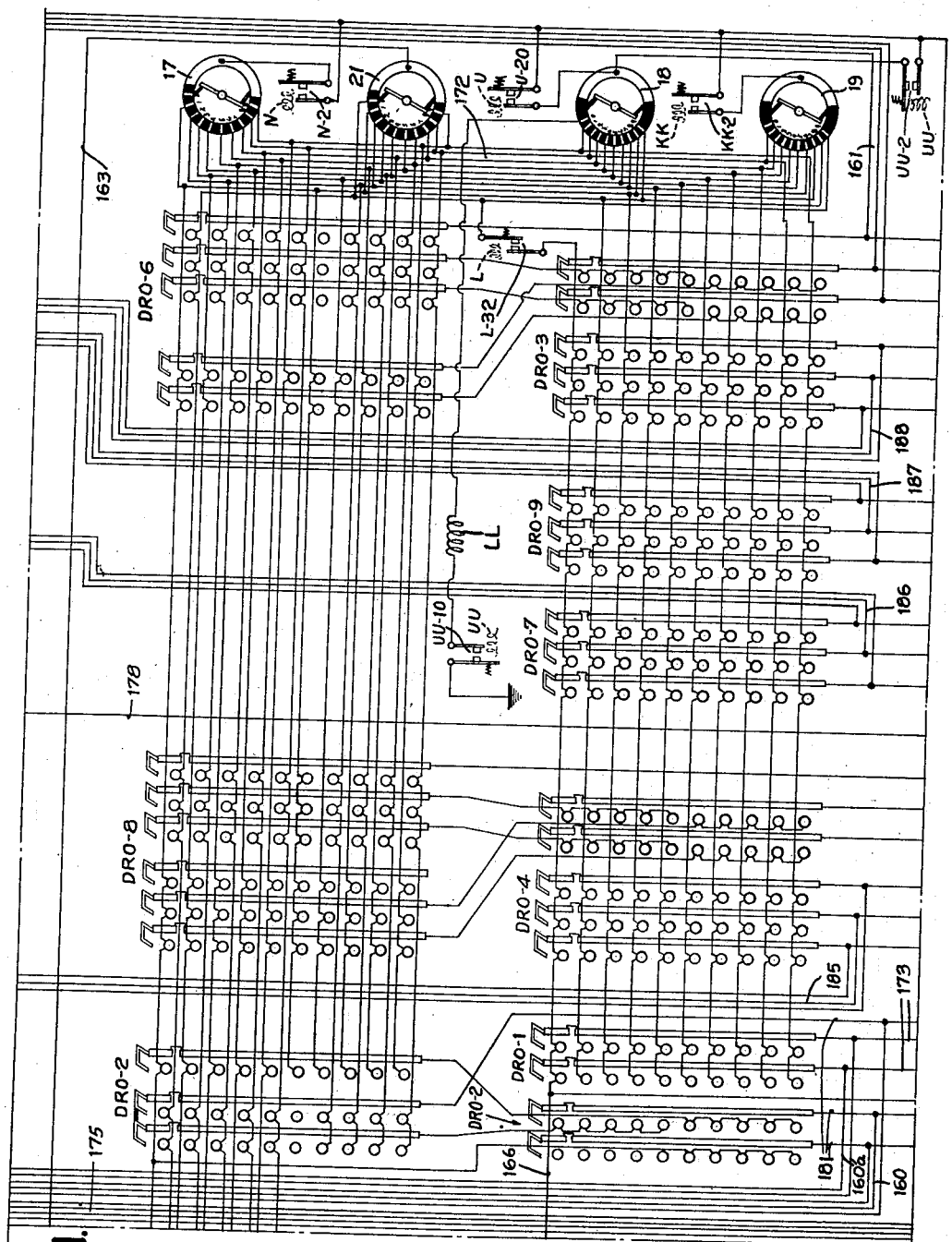

The various accumulators of the machine are provided with readout devices which in detail of construction are of the type previously described, but which are arranged with single and multiple sections in a manner to be hereinafter explained in more detail in connection with the circuit diagram. Briefly, it may be stated, however, that the DR section of the machine comprises five accumulators which may be known as DR—1, DR—3, DR—4, DR—7 and DR—9. The DR—7 and DR—9 accumulators are provided with straight readouts only, designated DRO—7 and DRO—9 on the circuit diagram (Fig. 15d). The DR—1 accumulator is provided with a straight readout DRO—1 and also with a so-called doubling readout DRO—2 and also with a so-called times 5 readout DRO—5 of a type known in the art. The DR—3 and DR—4 accumulators are provided with straight readout sections DRO—3 and DRO—4 and with doubling readout sections DRO—6 and DRO—8.

Quotient place mechanism

In addition to the readout structures, the machine is provided with a quotient place mechanism which is generally in the nature of a readout structure. This quotient place mechanism is shown in Fig. 1 and a portion of it is diagrammatically illustrated in Fig. 2a. As shown in Fig. 2a, it comprises a series of brush assemblies generally designated 105 fast to but individually insulated from a shaft 106 and concurrently positioned by a knurled wheel 107 fast to the shaft 106. The knurled wheel may be conveniently provided with a pointer 108 cooperating with an index 109. Each brush assembly 105 cooperates with a readout commutator 110 and with an associated common segment 111. Each readout commutator has four readout or segment spots corresponding to four columns, the maximum number of quotient places which may be obtained with the present machine.

In the instant machine, there are ten commutator sections, only three of which are shown on Fig. 2a, the remainder being shown on the circuit diagram. It will be understood that the brush assemblies are concurrently positioned and that they may be set to stand on any one of the segment spots from 1 to 4 inclusive. On the index 109 the numbering is doubled because of the dual brush arrangement. In positioning this quotient place mechanism the knurled wheel 107 is turned up to the maximum places desired in the quotient.

Operation

Before describing the circuit diagram of the machine the general operation of the machine will be briefly explained. It will be assumed that the present machine is intended to handle dividend entries of a maximum of four columns and divisor entries of a maximum of two columns. Obviously, the machine may have a greater or less capacity. Upon a card entering the sensing section of the machine the pre-sensing brushes 101 sense the divisor and dividend fields of the cards and selectively control the entry of the divisor and the dividend in the following manner. In entering, the divisor entries are made into certain orders of the divisor entry receiving device in such a manner that there is always an unused column to the extreme left in each device, except with the DR—1 device, in which the entry always goes as far to the left as possible. There is a shift on entry to get the entry as far to the left as possible, taking into account the extra column to the left in the DR—3, DR—7 and DR—9 devices.

The dividend is entered as far to the left as possible in a selective manner, but in such manner as to leave two columns to the left of the entered dividend. In short, the pre-sensing brushes feel for the highest order significant digit column of both the dividend and divisor and control the entries into the respective entry receiving devices accordingly in the manner indicated.

According to the present invention, the general mode of operation of the machine is as follows: Unlike previous machines, wherein division was effected by a successive subtraction, the present machine operates differently in that the number of subtracting operations are materially cut down over the number required in a successive subtraction type of dividing machine. The machine, in lieu of proceeding by successive subtraction of the divisor, operates in a different manner and with a different principle of operation. In the operation of the machine, the amount of the divisor is turned into multiples of the divisor from 1 to 9. The manner of building up the multiples of the divisor may best be understood by referring to diagrammatic view Fig. 13. As shown in this figure, the divisor amount is an amount of 12. Upon original entry from the card, this divisor amount of 12 is concurrently entered into DR—1, DR—3, DR—7 and DR—9. Thereafter there is a readout of double the divisor or 24 from the doubling readout section DRO—2 of the DR—1 receiving device and such amount of 24 is entered into DR—3, DR—4 and DR—9. Thereafter and upon a following cycle, there is a further entry of double the divisor or 24 into DR—4 and during this same cycle there is an entry of 6 times the amount of the divisor, i. e. 72, from the doubling readout DRO—6 associated with the DR—3 entry device into DR—7 and DR—9. It will be accordingly seen that as a result of the foregoing additive entering operations and/or original entries, the DR—1 device will have set up upon it the amount of DR—1 and from the readouts associated with this device the amount of the divisor itself, the divisor times 2 and the amount of the divisor times 5 can be derived. From the DR—4 device the 4 and 8 multiples of the divisor can be derived and from the DR—7 and DR—9 devices the 7 and 9 multiples can be respectively derived.

The DRO—1, DRO—2, DRO—3, DRO—4, DRO—5, DRO—6, DRO—7, DRO—8 and DRO—9 readout devices, taken collectively and when set by their related receiving means constitute representing or readout means from which, after such setting, all the different digital multiples of the divisor may be derived.

The foregoing operations in which the multiples of the divisor are built up require three accumulator entry cycles. In the second half of the third accumulator entry cycle, further operations are effected. These further operations will now be briefly generally explained.

After the various multiples of the divisor are set up and available for readout as above explained, the next step of operation is to effect an immediate and concurrent comparison of the left hand portion of the dividend amount with all of the divisor multiples. In the typical calculation of Fig. 13, the 14 portion of the dividend amount is concurrently compared with the divisor multiples 12, 24, 36, etc. The machine automatically ascertains that the times 1 multiple of the divisor or 12, the divisor itself, is the highest divisor multiple amount which is less than or equal to 14. In the actual circuit operation and as will be subsequently explained, the limiting comparison and selection is effected by the first divisor multiple amount which is too big to go into the compared portion of the dividend. Special conditions pertain to a times 9 multiple.

After the foregoing comparison has been made, the next step in the operation of the machine (which operation takes place in a following machine cycle) is to select the highest going multiple of the divisor and to cause the subtraction of this amount by complemental addition from the compared portion of the dividend amount in the dividend entry receiving device. In the diagrammatic calculation, the nines complement of 12 is 87 which is added to 14. At the same time that this entry is made, an entry of a quotient amount of one, which corresponds to the one multiple of the divisor is made in the extreme left hand column of the dividend and quotient accumulator DDQ. This one becomes the first column of the quotient. Following the entry of 87 an elusive one is added to convert the previously derived nines complement into a tens complement. The result of this operation is to obtain a setting on the dividend and quotient entry receiving device of 100280, thereupon a further comparing operation ensues. The machine ascertains that 24 is the highest going multiple and accordingly enters the nines complement of 024 or 975 into the dividend accumulator, making at the same time a quotient entry of 2, which 2 entry is made at this time into the next to the left hand column of the dividend and quotient accumulator. There follows the further entry of an elusive one to create the nines complement into a tens complement and a further comparing operation then takes place. At this time, 36 is ascertained to be the highest going multiple and there is an entry of a nines complement of 036 or 963 into the dividend device together with an entry of a 3 in the proper column of the quotient accumulator. The final operation is to add an elusive one as indicated and inasmuch as the place limiting device is set for three quotient places the machine operation automatically terminates. The further operation comprises the recording of the quotient and the remainder back on the record card. Various resetting operations are performed at this time.

The foregoing gives a general statement of the mode of operation in its essentials. The machine first renders available for comparison multiples from 1 to 9 of the divisor. It then, by a concurrent comparing operation, finds out which is the highest going multiple of the divisor and then effects a subtraction of such highest going multiple. By proceeding in this manner machine operating time is materially saved over previous constructions which proceeded by successive subtraction of the divisor. It may be explained that the saving in time of operation develops particularly with large dividing computations and that in the instant machine the limitation of dividend and quotient places to a small number has been made for simplicity of illustration. In short, regardless of what the dividend amount is, there are three building up cycles for building up the multiples of the divisor. Two of such cycles occur during the card feed cycle and one extra accumulator cycle is required for final building up operations. The comparing cycles in number depend upon the number of places to which the computation is to be carried out and all comparing is effected concurrently and not successively, that is to say, the machine is so arranged that in any one comparing cycle comparisons can be concurrently effected with nine possible multiples of the divisor and it should be particularly noted that the machine does not have to first compare one multiple of the divisor and thereafter compare another one and so on, but in contradistinction the comparison is concurrent for all multiples. It may be further explained that the comparing operations and subtracting and quotient entering operations occur in the same accumulator cycle, but in different portions thereof. As stated before, the present machine operates on a twenty point cycle. Generally stated, index points 14 to 20 of a preceding cycle are available for comparing and the first twelve points of a succeeding cycle are available for the subtractive entry, including the elusive one entry and for the quotient entry. With the machine timed as shown in the instant application, comparing is actually effected within the range between 14 to 19 index point positions.

*Circuit diagram*

It will be assumed that properly perforated cards perforated with the amount of the divisor and the dividend are in the usual supply magazine of the card handling section of the machine (see Fig. 2). To start the machine in operation switch 130 (Fig. 15g) is first closed to supply current for the main driving motor and for the punch driving motor. Rotation of the main driving motor puts into operation the A. C.-D. C. generator 132 (Figs. 15b and 15g). The A. C. end of this generator supplies current to bus 133 and to ground and the D. C. end of the generator supplies current to buses 134 and 135. The start key is now depressed to close start key contacts 136 (Fig. 15g) and to complete a circuit from the 134 side of the D. C. line through relay coil C, through 136 now closed, through relay contacts G—1 now closed, cam contacts FC—1 to the 135 side of the D. C. line. A stick circuit is also established through relay contacts C—2, and cam contacts FC—2 now closed. Energization of relay coil C also closes relay contacts C—1 establishing a circuit from the 134 side of the D. C. line through relay contacts F—1, through card feed clutch magnet 138 (see also Fig. 1), through cam contacts FC—3 now closed, through stop key contacts 139 now closed, through relay contacts C—1 now closed, through punch control contacts P—1 now closed and back to line 135. As in previous machines, the start key must be kept depressed for several cycles in starting up a run or alternatively, it may be depressed and again depressed. Starting operations are prevented until the feed rack of the punch is in proper right hand position, this being provided for by the customary punch controlled contacts P—1.

Before starting up the machine, the proper plug connections will be made at plug board 140 (see Fig. 15a) to provide for the entry of the dividend into the dividend receiving device in a manner to be hereinafter explained in further detail. Plug connections will also be made at plug board 140a (Fig. 15b) to provide for the entry of the divisor. Other plug connections will be made at plug board 141 (Fig. 15a) to properly plug up the advance or pre-sensing brushes 101 to certain controlling relays. The divisor field relays are designated 142 and the dividend field relays 143. The related contacts are shown at 142a and 143a, there being a single contact pair controlled by each relay coil. When a contact 142a, for example, is closed, it serves to energize a relay coil 144 and similarly the closure of a contact pair 143a serves to energize a related coil 145. Coils 145 and 144 have associated therewith transfer contacts designated 145a and 144a. The function of these transfer contacts is this—when a transfer contact, for example 145a, pertaining to a given denominational order, is closed, the closure of such contact will serve to energize all coils 145 to the right or in relatively lower denominational orders. Transfer contacts 144a similarly control the energization of coils 144 pertaining to lower denominational orders. Coils 145 and 144 likewise control stick contacts 145b and 144b and such stick contacts when closed, establish a stick circuit from the 134 side of the D. C. line through any one or more of the coils 145 and 144 and back to the 135 side of the D. C. line, through cam contacts FC—7.

It may be explained and as shown on the timing diagram, FC—7 close late in the card feed cycle when a card is passing the advance sensing brushes 101 (Fig. 2).

According to the selective energization of coils 145 and 144 in the manner above explained, there is a selected directed entry of the dividend and divisor into the corresponding entry retaining devices. Such selected entries are provided for by the contacts 145c (Fig. 15a) and 144c (Fig. 15b). Such contacts, according to their selective closure, direct the entry of the dividend into such of the DD dividend receiving devices as receive the dividend entry from the card so that the dividend always enters therein, leaving two clear columns to the left of the entry. Similarly, pyramidical contacts 144c, according to their selective closure, selectively direct the entry of the divisor into the DR receiving devices so that it goes to the left of the devices, leaving one clear column to the extreme left, except that with the DR—1 device the entry is always made to the extreme left.

In passing, it may be stated that the pickup circuits for the coils 142 and 143 is completed through the following path.

Referring to Fig. 15a from line 135 through card lever contacts 103, through cam contacts FC—6, through the distributor 16, through the common contact plate 146, thence via the brushes 101, through plug connections at plug board 141, through the coils 142 and 143 and back to line 134.

At the end of the first card feed cycle the first card will have been advanced to a point at which it is about to be read by the sensing brushes 100. During the second card feed cycle the card traverses the brushes 100 and the dividend amount is entered into DD and the divisor amount is entered into DR—1, DR—7, DR—9 and DR—3. In Fig. 15b, the accumulator magnets have been given reference numerals corresponding to the related accumulators. These magnets, it will be understood are the magnets which have been given a reference numeral 45 in connection with the previous detailed description of a particular accumulator unit. It may be explained that at the end of the first card feeding cycle the card lever contacts 102 (Fig. 2) will be closed by the card, causing energization of relay coil H (Fig. 15g) and causing relay contacts H—1 (Fig. 15b) to close. As the second card feed cycle ensues, the card is carried past the brushes 100 and the dividend accumulator DD receives the dividend entry and the DR—1, DR—7, DR—9 and DR—3 accumulators receive an entry of the divisor.

Before tracing the entry circuits it may be explained that just after the card feed cycle is initiated, after the preliminary cycle, cam contacts FC—22 (Fig. 15b) close. The entry circuits for the dividend and divisor will now be traced. Current flows from the A. C. line 133 (Fig. 15b) through relay contacts H—1 now closed, through cam contacts FC—22 now closed, through impulse distributor 15 to the card transfer and contact roll 87, through the brushes 100 pertaining to the divisor, through plug connections at plug board 140a, through pyramidical contacts 144c, through the V—1—6 contacts now closed by the energization of coil V. Coil V becomes energized (see Fig. 15g) upon the closure of cam contacts FC—16 at the beginning of the second card feed cycle at which time relay contacts H—2 are also closed.

Referring back to Fig. 15b, from the closed contacts V—1—6, individual circuits extend through the non-shifted U—7—15 three-blade contacts which are now in the position shown and thence to the respective DR—7, DR—9 and DR—3 accumulator magnets. A supplemental circuit extends from contacts 144c, through the non-shifted U—1—2 contacts to the DR—1 accumulator magnets to provide for the entry of the divisor into this accumulator.

Referring now to Fig. 15a and the manner of dividend entries, the supply circuit for contact roll 87 is that previously described. From contact roll 87, circuits are established through the brushes 100 pertaining to the dividend, through plug connections at plug board 140 through pyramidical contacts 145c, through relay contacts V—7—10 which are closed by the energization of relay coil V in the manner previously explained, through three-blade contacts UU—5—8 now in the position shown and thence via circuits to the DD accumulator magnets labelled "DD" on Fig. 15a.

The hand initiating control is cut off after the operations have been properly started in the following manner.

At the beginning of the second card feed cycle the closure of cam contacts FC—5 (Fig. 15g) will cause energization of relay coil G. Current flows from line 134 through G, through FC—5, through card lever contacts 102 and back to line 135. With G energized, contacts G—1 shift cutting off the circuit to the start key contacts 136 but maintaining the circuit to cam contacts FC—1. The energization of G will also close relay contacts G—2 and establish a stick circuit for relay coils G and H either through the FC—1 contacts or the card lever contacts 102. As usual, the making time of FC—1 overlaps the time when card lever contacts 102 open between cards.

It has been previously explained how the selective closure of pyramidical contacts 145c (Fig. 15a) and 144c (Fig. 15b) selectively direct the entries. After such entries are made a further card pertaining to a succeeding computation will be fed and pass the advance sensing brushes 101.

Before such following card passes the advance brushes provision must be made for breaking down the setup which controls pyramidical contacts 145c and 144c. But before breaking down such setup a retained setup must be made corresponding to the previous setup of 145c and 144c for controlling subsequent readout operations during the recording of result data pertaining to the computation related to the card which had been previously sensed. This retained setup is provided for in the following manner. Relay coils 145 and 144 (Fig. 15a) in addition to controlling the contacts previously referred to control supplemental contacts 145d and 144d. Before cam contacts FC—7 (Fig. 15a) open to de-energize relay coils 144 and 145, cam contacts FC—14 (Fig. 15a) will close to energize relay coil A. The energization of relay coil A causes closure of relay contacts A—1—4 and accordingly when cam contacts FC—15 close, circuits are completed through the now closed A—1—4 contacts, to such of the contacts 145d and 144d which have become closed to selectively energize coils 155 and 154. These coils have stick contacts 155a and 154a associated therewith which retain the related coils energized after FC—15 and relay contacts A—1—4 open. The stick circuit from the 155a and 154a contacts is through the normally closed LL—2 contacts back to line 134.

By the foregoing operations the setup which was previously on coils 145 and 144 is now upon coils 155 and 154.

The machine is now ready to build up multiples of the divisor by additive entries in the manner which will now be described.

Referring now to Fig. 15g, during the second half of the second card feed cycle with relay contacts G—6 closed, a circuit will be completed through relay coil N, the circuit extending from line 134, through G—6, N, through cam contacts FC—19, to line 135. N is maintained energized by stick contacts N—1, and the stick circuit extends back to line through the CC—14 contacts. With relay coil N (Fig. 15g) energized contacts N—2 (Fig. 15d) close, supplying current from the A. C. line to the emitter 17. As the operation ensues, the emitter 17 emits impulses through DRO—2 (the doubling readout associated with DR—1) and impulses representative of double the amount of the divisor flow over the set of lines 160 (Fig. 15d and Fig. 15b) to the W—1—9 contacts. Such contacts are closed by relay coil W which is energized in the following manner.

Referring to Fig. 15g when cam contacts FC—17 close, coil W becomes energized, relay contacts H—2 being closed. From the W—1—9 contacts the circuits extend through U—4—6 contacts to accumulator DR—4 and through U—10—12 to DR—9 and through U—13—15 to DR—3. At this stage the setup of the respective DR devices will be according to cycle 2 of Fig. 13.

Subsequently there is a further building up cycle. Upon the next emission of impulses by emitter 17 there is a repeated entry of twice the divisor from the doubling readout DRO—2 into the DR—4 accumulator via circuits 160 (Figs. 15d and 15b) through the now closed Z—1—3 contacts which become closed on energization of relay coil Z, thence to the DR—4 accumulator magnets. The entry is through the U—4—6 contacts now in the position shown. Relay coil Z is energized as follows (see Fig. 15g): Upon closure of contacts FC—18 with relay contacts G—3 closed, such coil Z becomes energized and it is maintained energized by stick contacts Z—13, the stick circuit extending back through cam contacts CC—14 to line 135. During this same cycle, provision is made to transfer six times the amount of the divisor from the doubling readout associated with DR—3 to the DR—7 and DR—9 accumulators. Emitter 17 emits through DRO—6, and impulses representative of the divisor times 6 flow over lines 161 (Figs. 15d and 15b), through the now closed Z—4—9 contacts, through the U—7—12 contacts to DR—7 and DR—9.

The machine has now set upon the respective DR receiving devices and rendered available for readout from the readout devices therewith, all possible digital multiples from 1 to 9 of the entered divisor. It may be explained that the DR—1 receiving device also has a times 5 readout section associated therewith. This is of a type known in the art and fully described in the copending application of A. H. Dickinson, Serial No. 752,520 and in corresponding British Patent No. 456,368, the wiring of which times 5 readout is fully explained therein.

Referring further to Fig. 15b, the contacts 62 and 61 are the carry controlling contacts which have been previously described. As is customary in machines of this type wherein electric transfer is provided, provision must be made to render these carry contacts ineffective under certain machine operating conditions. It is for this purpose that supplemental transfer control contacts J—1—8 are provided on Fig. 15b. On the dividend and quotient counter like contacts J—9—11 inclusive are provided. Such J—1—11 contacts are normally open contacts and are closed at the carry time in the cycle by a J relay magnet (Fig. 15g) which is energized during the transfer period by cam contacts CC—23. In connection with the electric carry circuit, it may be mentioned that the carry impulse is available upon closure of cam contacts CC—13 (Fig. 15b) which close at the carry time in the cycle.

Before describing the concurrent comparing operations which is the next main step in the operation of the machine, it may be explained that certain column shift controls have to be brought into operation to select proper columns from which the comparison portion of the dividend is to be derived.

In the present machine, the capacity is two orders for the divisor and four orders for the dividend. The number of columns in the comparison portion of the dividend is 3 because the highest multiple of a two column divisor comprises three orders. In selecting the columns in the dividend for comparison, accordingly three columns are required and on the first comparison portion selecting operation such three columns are selected as follows. Two of the columns comprise the two highest order columns of the dividend amount and the third column comprises the column containing a zero to the left of the highest significant column amount of the dividend. The column shift means for comparison operations accordingly is for three orders. If machines of a greater capacity were required, this structure would be increased in capacity, i. e. for a three column divisor, four column capacity for column shift selection of the comparison portion would be required and so on.

On the first selection of a comparison portion the left hand order to be interrelated in the dividend receiving device is invariably the order containing a zero which is just to the left of the highest order which contains a significant digit. After the first comparison and deduction is made there will be successive further shifts to the right and in certain cases orders will be skipped over under certain zero control conditions as will be hereinafter explained.

Figure 13:
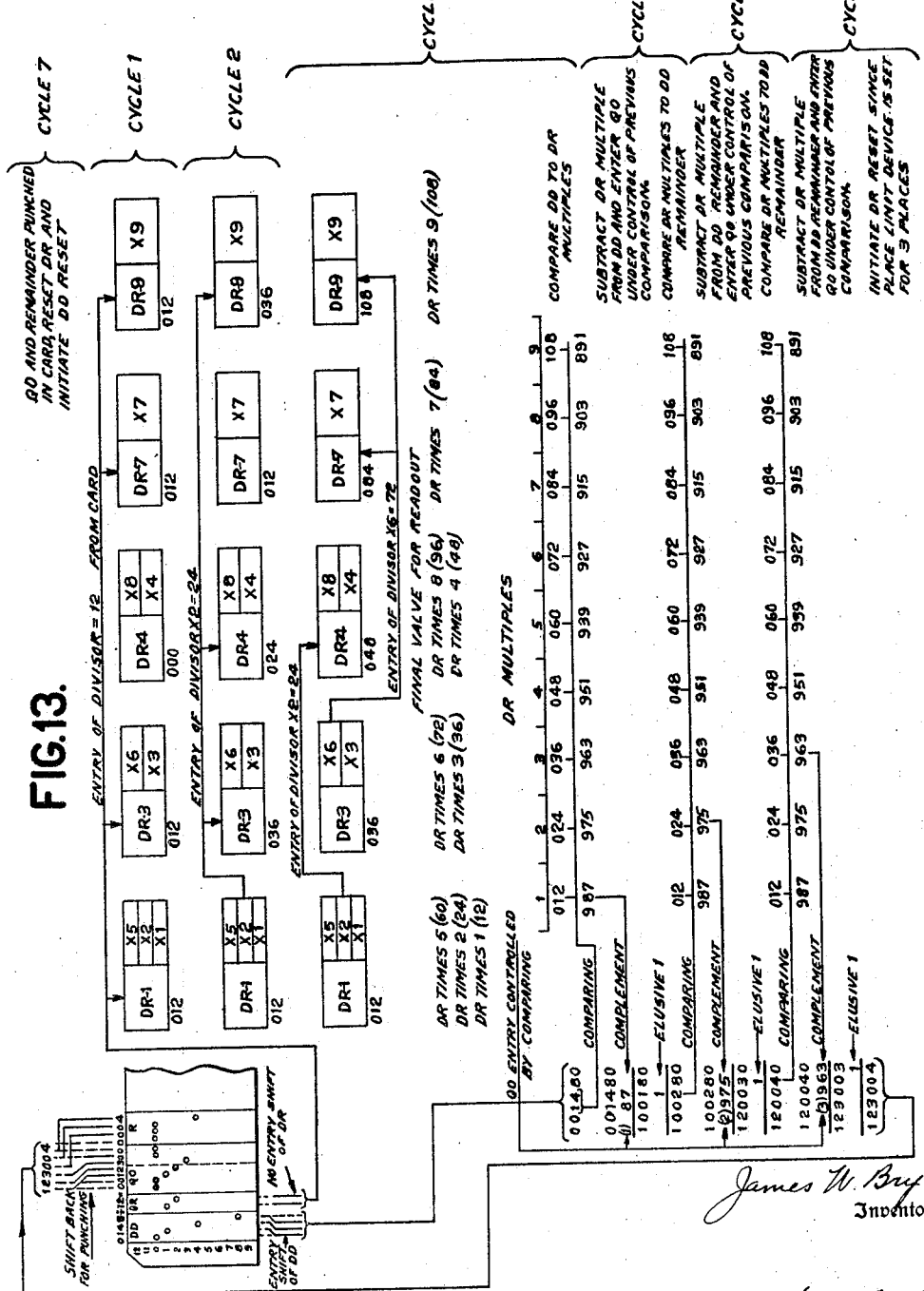
Fig. 13 is a diagrammatic view showing the general flow of entries and of calculated amounts through the machine and showing a typical dividing calculation as performed by the machine.

Referring to Fig. 13, it will be noted that the dividend amount is 001480. On the first comparing operation the only columns of the dividend which are actually compared are the columns containing the 1 and the 4, but a separate control is provided for the zero to the left of the 1. Column shift mechanism must be called into operation before comparing operations so that a principal portion of the dividend hereinbefore and hereinafter called the comparison portion, is selected for comparison. This column shift selection to effect such comparison will be presently described.

As a preliminary operation to column shift to select the comparison portion, a calculating initiating control relay must be called into action. It will be recalled that during the building up of the multiples of the divisor that relay coil Z was energized and maintained energized. With Z energized, relay contacts Z—14 (Fig. 15g) are closed, causing energization of relay coil BB. BB is held energized by stick contacts BB—1. The stick circuit being established at the time cam contacts CC—16 close. It may be mentioned that BB is maintained energized from a time in one cycle over into the next cycle. Such relay BB may be termed a calculation initiating means or magnet. It is the energization of this magnet which primarily initiates column shift preceding comparing operations. With BB energized (see Fig. 15a) current will flow from line 134 through the now closed 3Y—1, 4Y—1, UY—2 contacts, through the now closed U—18 contacts, and at the proper time in the cycle, when CC—17 close, through the BB—2 contacts now in shifted position and down to and through the ICS relay coil to the 135 side of the line. Energization of ICS will effect closure of relay contacts ICS—7 to 9 (Fig. 15c). At this point it may be mentioned that relay contacts ICS—7 closes a circuit to line 166 which is a zero impulse line leading to the zero spot of emitter 21, the circuit being completed through relay contacts L—32. The ICS—7 to 9 contacts accordingly establish circuits from the comparison portion columns of DDRO and from zero impulse line 166 to a set of lines 162 (Figs. 15c and 15e). Two of such circuits extend through coils EE and FF and the circuits extend down to one side of relay contacts LI—3. The other side of these contacts connects to dividend comparison coils IDM, 2DM and 3DM. Such coils connect to a circuit extending back to the other side of the line.

Before tracing the flow of comparing impulses, another comparing preliminary control must be set up.

Referring to Fig. 15g, upon energization of relay coil ICS in the manner previously explained, relay contacts ICS—11 (Fig. 15g) will become closed, causing energization of relay coil KK. KK has a stick circuit through stick contacts KK—1 which extends to the other side of the line, through relay contacts U—19. With relay coil KK energized, relay contacts KK—3 become closed and will cause energization of relay coil L upon closure of cam contacts CC—20. With relay coil L energized, the related contacts L—1—33 are closed. With such L—1—33 contacts closed, and with relay contacts ICS—7 to 9 closed, a set of comparison circuits are established from the comparison portion of DDRO (see Fig. 15c) down through ICS—8 and 9, a zero impulse circuit being completed through ICS—7, down via the set of wires 162 (Fig. 15c) to Fig. 15e. Two of the circuits extending through coils EE and FF and thence through the now closed L—1—3 contacts to the IDM to 3DM dividend matching or comparison coils. It may be mentioned that the prefix "1" signifies the highest order and the prefix "2" and "3" signifying relatively lower orders.

The actual comparison operation may best be understood by tracing the circuit relations on Fig. 17, which shows a portion of the complete set of circuits, particularly the comparing or matching circuits.

In explaining comparing, the last comparing operation of Fig. 13 will be taken for purpose of illustration and explanation. In this particular calculation, the dividend comparison portion is 040. This amount of 040 is to be concurrently compared with all possible multiples of the divisor, but for simplicity of explanation, the operations will be traced for a concurrent comparison between 040 with the 3 and 4 multiple of the divisor, viz. 036 and 048.

Referring now to Fig. 17, before this particular comparing cycle occurs, relay coil 3CS becomes energized so that contacts 3CS—8 to 10 are closed. Contacts L—1—3, L—25—27 and L—13—15 and L—31 are also closed. With emitter 21 in operation and with contacts L—31 closed, impulses flow from the emitter to the transverse buses and readouts, DDRO, DRO—3 and DRO—4. Inasmuch as the emitter emits impulses in succession from 9 to zero, the first permitted out-flow of impulses will be through the units order brush on DRO—4, which is standing on the 8 spot. Such impulse at the 8 index point time in the cycle flows down through the L—15 contact and energizes relay coil 4Mu and causes closure of contacts 4Mu—1. Impulse flow continues through the now closed 3DM—5 contacts to relay coil 4Gu, energizing this coil. With 4Gu energized, it is maintained energized by stick contacts 4Gu—1, the stick circuit going back to the 135 side of the line through relay contacts CC—15.

It will accordingly be appreciated that when the comparison dividend amount of 040 is being concurrently compared with 036 and 048, the units order column of all amounts will be tested for the highest unit in each column of the respective readouts DDRO, DRO—3, and DRO—4. In this comparison 8 is the highest digit in these multiples of the divisor in the units order and accordingly relay coil 4Gu becomes energized signifying that 8 is higher than zero which is the units order amount of the dividend comparing portion. The operation can now be traced for the sixth brush position in the units order of DRO—3. Impulse flow will be via the transverse bus through the units order brush of DRO—3 down through contact L—27 now closed to energize the 3Mu magnet, causing closure of contacts 3Mu—1 through contacts RDM—4 to energize relay coil 3Gu and cause closure of stick contacts 3Gu—1. The energization of 3Gu will signify that 6 in the units column of DRO—3 is greater than the amount in the units order column of DDRO. The circuits will now be traced for the tens order column on all readouts. In this column the tens order brush of DRO—4 is on the 4 spot and the tens order brush of DDRO is on the 4 spot. Accordingly, when the impulse emitter 21 reaches the 4 spot there is a concurrent out-flow of impulses from the tens order of both DDRO and DRO—4. There will accordingly be at the 4 index point in the cycle a momentary energization of FF and a momentary energization of 4M$t$. With FF thus momentarily energized, there will be a momentary closure of relay contacts FF—3 and FF—4. At the same time that relay coil FF is energized, relay coil 2DM becomes energized. The energization of coil 2DM causes opening of relay contacts 2DM—5. Such 2DM—5 contacts are in circuit with relay contacts 4M$t$—1 contacts, which contacts are closed upon the energization of 4M$t$. The contact relations of contacts 2DM—5 and 4M$t$—1 are such that contacts 2DM—5 open in advance of the closure of contacts 4M$t$—1. This may be effected by proper adjustment of the contact blade springs so as to make the gap between the initial contacts 4M$t$—1 relatively great so that such contacts will be late in closing. Such action may also be secured by increasing the air gap between the armature and core. Blade adjustment may be secured in well known ways, for example, by bending up the usual metallic strip which supports the blade spring. See U. S. patent to Lake et al. No. 1,987,343, noting the unlettered metallic strip below the upper blade of the contact pair 29 in Fig. 2. Air gap may be increased by bending the armature of the relay away from the core. Thus contacts 2DM—5 are fast to open contacts and contacts 4M$t$—1 are relatively slow to close contacts. Accordingly, there is an incomplete circuit through the 2DM—5 contacts and there is no energization of relay coil 4G$t$ at the 4 index point time in the cycle, via any impulse flow coming down through 2DM—5.

It has been explained that relay coil FF is energized at the same time that relay coil 4M$t$ is energized. With relay coil FF energized, relay contacts FF—4 are closed and such closure occurs at the same time that contacts 4M$t$—2 are closed. An energizing circuit is accordingly established to a 4E$t$ magnet which is maintained energized by stick contacts 4E$t$—1. Likewise contacts 4E$t$—2 become closed. The closure of the 4E$t$—2 contacts causes an energization of 4G$t$ due to the fact that 4G$u$ was previously energized and maintained energized inasmuch as the 8 in DRO—4 was greater than the zero in the units order column of DDRO. The circuit for energizing 4G$t$ under this condition is from line 135 through CC—15, through line 168, line 169, through contacts 4G$u$—1 which are now closed, up the vertical line over the cross-transfer line 167, through the 4E$t$—2 contacts, down through 4G$t$ and back to line 134. The following law may thus be stated. When the dividend comparison amount in one order is equal to the divisor multiple comparison amount in the same order, the machine will then take into account the relative values of the digits in the next lower order of both the dividend comparison amount and the divisor multiple. In such case if the divisor multiple amount is greater than the dividend digital amount there will be a transfer of the control relation. Thus, since 8 in DRO—4 in the units order is greater than zero in the units order of DDRO there will be an energization of 4G$t$ due to the 8 being greater than zero in the next lower order, notwithstanding the fact that the digit 4 is the same in DDRO and in DRO—4.

The operations will now be traced for a comparison of 3 in the tens order of DRO—3 with 4 in the tens order of DDRO. Under this condition, the divisor multiple of 3 is "less than" the dividend digit of 4. The first impulse flow will be through the tens order brush of DDRO upon the emitter 21 encountering the spot 4. Such impulse will flow down through the closed 3CS—3 contacts and cause a momentary energization of FF and flow through the L—2 contact to energize 2DM. 2DM will be stuck by 2DM—1. Energization of 2DM will open the 2DM—4 contacts and such opening will occur at a time in advance of the impulse flow down from the tens order brush on the 3 spot of DRO—3. Accordingly, when impulse flow takes place through the tens order brush of DRO—3 while magnet 3M$t$ becomes energized and contacts 3M$t$—1 become closed there will be no circuit established down through 2DM—4 and no energization of magnet 3G$t$. The foregoing explains the "less than" control.

There will now be traced the concurrent comparison portions which take place in the hundreds order of all three readouts. As shown, the hundreds order brush of the three readouts is at zero. There is accordingly, a concurrent attempted emission of impulses out through L—13, L—25 and L—1. Coils EE, 3M$h$ and 4M$h$ will be momentarily energized. There will be a momentary closure of relay contacts EE—3 and EE—4, 3M$h$ and 4M$h$ being momentarily energized. There will be a momentary closure of 3M$h$—2 and 4M$h$—2. With contacts 3M$h$—2 and EE—3 and 4M$h$—2 and EE—4 momentarily and concurrently closed, there will be energization of the 3E$h$ magnet and the 4E$h$ magnet and such magnets will be maintained energized by their stick contacts.

The foregoing has traced comparing operations for a less than condition and a greater than condition and has explained the principles for an equal to condition in a given order. If there is an equal to condition in say DDRO and DRO—3 in both orders of each readout, there will be a pickup of the 3E$h$ coil and a 3E$t$ coil signifying that the comparison portion of the dividend is equal to in both orders of the compared multiple of the divisor.

Going back to the comparison problem just traced, it will be recalled that the dividend comparison portion is 040, one multiple of the divisor is 036 and the next multiple of the divisor is 048. With such conditions, the ultimate relay setup following comparison is as follows:

The following relay coils will be de-energized, 3G$h$, 3E$t$, 3G$t$. The following coils will have become energized, 3E$h$, 3G$u$, 4E$h$, 4G$h$, 4E$t$, 4G$t$ and 4G$u$. These last mentioned sets of coils may be aptly termed "equal to, greater than" or "less than" selecting coils or comparison result relays.

From the foregoing it will be understood that I provide comparing means for comparing the multi digit dividend amount derived from DDRO concurrently with each of a plurality of other multi digit amounts available upon DRO—3, DRO—4, etc. and for representing the results of such comparison. Such comparing means includes the relays which are active in the actual comparison of digits. These are the relays such as the various M relays, i. e. 1M, 2M etc., and the relays EE, FF etc. and the various DM relays, i. e. 1DM, 2DM etc. The devices for representing the results of digital comparison are the various G and E relays, i. e. 1G, 2G etc., 1E, 2E etc. Certain of these G and E relays, such as the relays G*h* and E*h*, may be said to represent individually comparison of multi digit amounts. Such particular relays may accordingly be termed multi digit comparison result relays while the relays which denote the results of digital comparison may be termed digital comparison result relays.

The E coils of these comparison result relays when energized indicate an equal condition in a columnar order and when de-energized indicate an unequal condition. The G coils when energized indicate a greater than status or that particular related column was equal and that a relatively lower column was greater. The G coils when de-energized indicate a reverse condition, i. e., a less than condition. It will be further noted that the comparison result relays which pertain to each readout, such as DRO—3 and DRO—4 (see Fig. 17), are arranged in sets, one set for each readout. While individual G and E coils are provided for each columnar order in each readout, there is a master multi digit comparison result relay in each set. In the set of the comparing relays controlled from the DRO—4 readout and also from DDRO, the master multi digit comparison result relay is 4G*h* relay, it pertaining to the highest order. In the comparison result relays pertaining to DDRO—3 and DDRO, the master multi digit comparison result relay is the 3G*h* relay. The master multi digit comparison result relays, such as 4G*h*, in turn constitute electromagnetic switching devices adapted to control related contacts, such as 4G*h*2 or 3G*h*2, etc. These contacts, such as 4G*h*2, 3G*h*2, etc. are controlled by the comparison result relays through their related master multi digit comparison result relay and constitute representing means or devices adapted to represent the setup of the comparison result relays and more particularly the setup of their related master multi digit comparison relay and act to primarily determine which one of the plurality of numbers is the greatest that is contained in the comparison amount.

By the foregoing selective control of relay energization at the termination of concurrent comparing operations, the relay coil 4G*h* will have become energized, but the relay coil 3G*h* will not have become energized. The fact that 4G*h* is energized will have shifted relay contacts 4G*h*—2 and brought about energization of a quotient selecting magnet 4Q, upon closure of cam contacts CC—30. 4Q is correlated with the 4 multiple of the divisor and its energization signifies that the 4 multiple of the divisor is the multiple of the divisor which is just too large to go into the comparison portion of the dividend. Its energization signifies that the quotient to be entered is a quotient amount of 3 and that the amount to be subtracted from the comparing portion of the dividend is the 3 multiple of the divisor. The relays such as 4Q etc. are controlled by the representing means or contacts previously mentioned and act to finally select a particular number which is the greatest that is contained in the comparison amount.

The foregoing construction wherein the control is based on the next higher multiple of the divisor requires a special control circuit when the highest going multiple of the divisor is the 9 multiple of the divisor. Under such conditions (see Figs. 15g and 15h), the contacts 2G*h*—2 to 9G*h*—2 are all in the position shown. With such contacts in such position upon closure of contacts L—33, a relay coil 10G*h* will be energized and will shift contacts 10G*h*—2 to closed position. This permits the energization of the coil 10Q. With coil 10Q energized, relay contacts 10Q—1 will close, permitting a readout from emitter 20 from the 9 spot to direct a quotient entry of 9. There will also be a subtractive entry of the 9 multiple of the divisor from the comparing quotient of the dividend. This 9's multiple subtractive entry is effective under the control of contacts 10Q—2 to 10Q—4 (Fig. 15f). It may be explained that while relay coil 10G*h* (Fig. 15h) is energized on all comparing operations and while such energization on all comparing operations causes closure of contacts 10G*h*—2, the closure of such contacts on comparing operations other than those pertaining to a 9 multiple of the divisor will be ineffective to energize relay coil 10Q because such energization will be prevented by the shifting of one or another of the 1G*h*—2, 2G*h*—2, 3G*h*—2, etc. contacts to reverse position, which shifting takes place when one or another of the lower numeral coils 2Q, 3Q are energized. In short, 10Q in order to exercise its times 9 control must be maintained energized at the quotient entry directing and multiple subtracting portion of the cycle and such energization will be prevented at this time in the cycle if a lower multiple Q coil is energized.

The foregoing explanation of Fig. 17 has explained the principles of operation of the concurrent comparison devices of the machine.

It will be understood that by the arrangement shown, a comparison is concurrently made of the representations of the various multiples of the entered divisor, which are available from the different readout devices with the comparison portion of the dividend upon the dividend entry receiving device. All comparing operations are made concurrently, that is to say, all multiples are compared in one and the same same comparing cycle to select which multiple is the highest going multiple.

The description of the operations will now be resumed in connection with the circuit diagram for the typical calculations.

Referring to the diagram, Fig. 13, the first comparing operation comprises the comparison of the comparing portion 14 of the dividend with all of the divisor multiples. All of the multiples, including the 2 times multiple and greater multiples of the divisor, are greater than the comparison portion of the dividend. Accordingly, all coils 2G*h*, 3G*h*, etc. will be energized in the manner described for the description of Fig. 17. Coil 1G*h* will not be energized, 1G*t* will not be energized and 1G*u* will not be energized. Coils 1E*h* and 1E*t* will be energized. With coil 2G*h* energized (see Fig. 15g), quotient and subtracting coil 2Q will become energized upon closure of cam contacts CC—30. Energization of 2Q closes relay contact 2Q—1.

Referring now to Fig. 15h, a circuit is established from the 133 A. C. line, through the KK—4 contacts, through a JJ coil supplying current to emitter 20. Upon the brush of emitter 20 encountering the 1 spot, a concurrent impulse flows over a line 170 (see also Fig. 15g), through the now closed 2Q—1 contacts up via line 171 (Figs. 15g, 15e, 15c and 15a) to and through contact 1CS—4 now closed to the extreme left hand quotient accumulator magnet. These magnets are generally marked DD on Fig. 15a of the diagram.

It will be understood that 1 is entered in extreme left hand order of the DD accumulator (this being the quotient receiving portion of the accumulator) by this operation. Concurrent with the entering amount of 1, there is a subtraction of 12 from the comparing portion 14 of the dividend. This subtraction is effected in the following manner.

Referring to Fig. 15d with relay coil KK energized in the manner previously explained, contacts KK—2 are closed, providing current supply for emitter 19. Emitter 19 is wired in a complemental manner to a set of common supply impulse lines 172. Lines 172 are wired to the transverse buses of the various DRO readouts and there is a readout of 87, the 9's complement of 12 from the direct section of DRO—1. The impulses representative of 87 flowing via a group of lines 173 (see also Fig. 15e) down through the now closed 2Q—3 and 4 contacts, via lines 174 (Figs. 15e and 15f), through the relay contacts ICS—13 and 14, back via a set of lines 175 (Figs. 15f, 15d, 15b and 15a), through dividend reset contacts UU—5 and 6 (Fig. 15a) now in the position shown and to the DD accumulator magnets pertaining to the comparing portion of the dividend to enter 87 therein and convert the previous setting from 14 to a setting of 01 (see Fig. 13). Following this entry of 87, an elusive 1 is entered in the following manner. Starting from the 133 A. C. line (Fig. 15b), through the CC—13 contacts via wire 176, via wire 177, through the U—3 contacts now closed, via line 178 (Figs. 15b, 15d and 15f), through the contacts 4CS—5 in the position shown, through the contacts ICS—14 now closed, via a line of the 175 group in the proper order and thence via the path previously traced, through UU—6 (Fig. 15a) to the lowermost accumulator magnet so that 1 is entered in the manner shown in Fig. 13.

Contacts ICS—12 and 2CS—12 prevent an undesired entry in an adjacent lower accumulator through the 61 contacts when an elusive 1 is being entered.

The amount now standing in the quotient and dividend accumulator is 100280.

*Place limiting control*

During the previously recited operation when a quotient figure was entered into the quotient accumulator, it was explained that the JJ coil (Fig. 15h) was energized.

Referring now to Fig. 15g with the JJ coil energized, relay contacts JJ—1 are closed and with relay contacts ICS—6, which is their status during this particular cycle, relay coil S will become energized and such coil will be maintained energized through stick contacts S—10, the stick circuit being completed back through cam contacts FC—20. The S control need not be further explained at this point, except to state that the above mentioned S control in effect determines the beginning column at which a quotient amount is entered. If no quotient amount was entered in the first column of the quotient receiving device there would be no energization of the S coil on such cycle because no quotient amount was entered. Later on, full explanation will be given as to the place limiting control which is based upon the energization of the S coil.

*Second stage of the computation*

The machine has now reached a status as shown in Fig. 13 at the latter part of cycle 4 where 100280 is on the dividend accumulator. Before a further comparing operation takes place, there must be preliminary column shift to newly interrelate the dividend accumulator with the various comparing circuits.

Referring now to Fig. 15a, it will be recalled that BB became de-energized after ICS became energized. BB—2 contacts are accordingly in the position shown so that upon closure of cam contacts CC—17 a circuit is established from the 134 side of the line, through the contacts 3Y—1, 4Y—1, UY—2, U—18, CC—17, BB—2 in the position shown, through ICS—3 now in shifted position due to the energization of ICS to and through 2CS and back to the other side of the line, 2CS being energized such magnet is maintained energized by stick contacts 2CS—1 and 2. In this connection it may be explained that there are two stick circuits for such coils as ICS, 2CS, etc. ICS has one stick circuit through ICS—1, which goes back to line through contacts 2CS—14 and cam contacts CC—18 and through the circuit previously traced. The other stick contacts for ICS are through stick contacts ICS—2 which stick circuit goes back to line through CC—19. De-energization and breaking of the stick circuit of ICS is effected upon the opening of cam contacts CC—19, which is timed to occur after contacts 2CS—14 open. The machine is now in condition with 2CS energized. With 2CS energized, contacts 2CS—8—10 (Fig. 15c) are in closed position, these contacts interrelate the columns containing the figures 028 of the dividend accumulator with the various comparing circuits.

Referring to Fig. 13, it will be seen that the highest going multiple of the divisor is the times 2 multiple or 24. Accordingly, by the comparing operations previously explained there is an energization of the 3Gh magnet and all like magnets having higher number prefixes. With magnet 3Gh energized (Fig. 15h), relay contacts 3Gh—2 (Fig. 15g) are in shifted position and the quotient selecting coil 3Q is energized, causing contacts 3Q—1 to close. Thereupon (see Fig. 15h) a circuit is completed from the line 133, through KK—4, to the emitter 20 and upon the brush of such emitter contacting the 2 spot, an impulse is emitted over line 180 (see also Fig. 15g) up through contacts 3Q—1, via the line 171 (Figs. 15g, 15e, 15c and 15a), through the 2CS—4 contacts and down to the DD accumulator magnet which is the second from the left in Fig. 15a. This will provide for a quotient entry of 2 into the quotient accumulator. Accordingly, with this quotient entry on 2 there is an entry of 975, the 9's complement of 24 into the dividend entry receiving device. Such complementary entry is caused by emitter 19 (Fig. 15d), such emitter receiving current upon closure of contacts KK—2 impressing complementary impulses on the set of wires 172. From these wires, connections extend through the transverse buses to the DRO—2 readout and the impulses flow through the 181 lines (Figs. 15d, 15f and 15e), through the now closed subtraction contacts 3Q—2—4, through the set of lines 174 (Figs. 15e and 15f), through the 2CS—5—7 contacts to the lines 175 (Figs. 15f, 15d, 15b and 15a), through the UU—5—7 contacts and to the corresponding DD accumulator magnets. This enters 975 into the dividend accumulator as indicated in Fig. 13. The elusive 1 is thereafter entered in a similar manner to the previous entry of the elusive 1 operation and explanation of this elusive 1 operation need not be repeated.

The dividend and quotient accumulator now has a setting of 120040. A further column shift must be brought about to interrelate the 040 in the dividend accumulator with the proper comparing circuits. The circuit is completed through a path previously traced, to and through the 2CS magnet (Fig. 15a), through the now shifted 2CS—3 contacts, down to the 3CS magnet energizing such 3CS magnet. This 3CS magnet is maintained energized by its stick contacts in a similar manner to that previously explained for the preceding 2CS magnet. With 3CS energized (Fig. 15a), contacts 3CS—8—10 (Fig. 15c) are shifted and comparing circuits are established as before with the ultimate effect that magnet 4Gh (Fig. 15h) becomes energized upon the concurrent comparing operation. The energization of 4Gh brings about shift of the 4Gh—2 contacts (Fig. 15h) and causes energization of the 4Q quotient and subtracting selecting magnet. With energization of 4Q, the 4Q—1 contacts are closed and at the 3 time in the cycle the emitter 20 emits an impulse over wire 182, through 4Q—1 and wire 171 (Figs. 15g, 16e, 15c and 15a), which 3 representing impulse ultimately flows through the now closed contacts 3CS—4 and down to the quotient accumulator magnet which is the third magnet from the extreme left in Fig. 15a.

The DD entry receiving device comprises six orders. The four highest orders are used to receive the quotient and the three highest orders do not have transfer contacts 61 and 62 associated therewith. No transfers are required for quotient entries. Orders further to the right have such contacts 61 and 62 which are required when this portion of the accumulator is used for deducting from the dividend. Contacts such as 3CS—12 and 4CS—10 are provided to prevent transfer entries from the 62 contacts from lower to higher orders following subtracting when the portion of the accumulator to which the transfer would go is receiving a quotient entry. Such contacts also prevent back circuits.

The divisor multiple of 036 is now to be subtracted by complementary addition of the amount 963 (see Fig. 13). As previously explained, relay coil 4Q (Fig. 15h) is energized at this time and with relay 19 (Fig. 15d) in operation and supplied with current through contacts KK—2, the complementary impulses will be impressed on lines 172 and flow out through DRO—3 to and through the 4Q—2—4 contacts (Fig. 15f) over the lines 174, through the 3CS—5—7 contacts, via the lines 175 (see Figs. 15f, 15d, 15b and 15a), through the UU—6 through 8 contacts down to the corresponding columnar orders of the dividend accumulator magnets. The elusive 1 is then entered in the same manner as before. The complete result of the dividing calculation is now set up on the quotient accumulator and the dividend accumulator contains a remainder amount of 4 (see Fig. 13).

*Place limiting device*

It will be assumed that the place limiting device is set for three places. Three places have been obtained in the quotient, viz. 123 and there is a 4 remainder amount which is to be recorded when the quotient is recorded. The brushes 105 of the place limiting device (Fig. 15a) are both set on the 3 spot. Similarly brushes 105 of Fig. 15e are also set on the 3 spot. Relay coil S will have been energized in the manner previously explained, causing shift of the three-blade contacts S—2 to the reverse position from that shown. Upon closure of cam contacts CC—21, current flows through the now shifted S—2 contacts, out through the brush 105 at the 3 position, through now closed 3CS—13 contacts, to wire 184 and causes energization of relay coil U (Fig. 15a). When relay U is energized stick contacts U—16 and U—17 close. From contacts U—16, a stick circuit is established from relay contacts T—2 now closed, a stick circuit going back to supply line 197. Subsequently, another stick circuit is established through contacts U—17 and cam contacts CC—28. The stick circuit becomes subsequently broken upon energization of relay T at which time the T—2 contacts open and breaking of the stick circuit U occurs at the time CC—28 open. In short, if the T relay is energized at the time cam contacts CC—28 open, the stick circuit for U will be broken.

It may be here explained that relay T becomes energized during the divisor reset cycle and energization of T occurs upon closure of cam contacts CC—29, the U—21 contacts being now closed.

The energization of relay magnet U terminates calculating operations by opening up the relay contacts U—18 (Fig. 15a), thereby cutting off further attempted column shift.

The energization of relay coil U also initiates reset of all of the accumulators for the divisor and multiples thereof. The reset initiating circuit is as follows:

Referring to Fig. 15d on energization of relay coil U, relay contacts U—20 are closed, supplying current to emitter 18. This emitter 18 is wired in tens complementary relation to wiring 172 so that upon emission of impulses thereby tens complementary impulses will be emitted through all of the various readout devices DRO—1, DRO—4, DRO—9, and DRO—3. The impulses which flow through the readouts which will represent the tens complement of the brush positions will flow up sets of lines such as 160a from DRO—1, 185 from DRO—4, 186 from DRO—7, 187 from DRO—9, 188 from DRO—3 and these impulses will flow through the now shifted U—1—2, the U—4—15 contacts, and back to the corresponding accumulator magnets of the related DR accumulators. This will cause an entry of the tens complement of the amount standing in the respective accumulators into such accumulators and bring the counter wheels back to zero. During such operation, however, the tens carry must be interrupted because otherwise the accumulators would receive an erroneous final setting of 1 instead of zero. It is for this purpose that the U—3 contacts are provided (Fig. 15b). These U—3 contacts being shifted to open position interrupt the transfer impulse circuit from cam contacts CC—13 to the transfer contacts 62 and prevent such undesired transfer.

It may be explained that the DD and quotient accumulator is not reset at the time the DR devices are reset because punching must be provided for from the DD and quotient accumulator before such accumulator is reset. Energization of relay U also serves to initiate punching of the quotient and remainder results. This is brought about as follows.

Referring to Fig. 15g, energization of relay U closes contacts U—17, energizing relay coil B when CC—31 closes. When B is energized relay contacts B—2 close, providing a stick circuit for B through the three-blade K—2 contacts now in the position shown. The energization of relay coil B also closes contacts B—I, whereupon current will flow from line 134, through B—I now closed, through the punch escapement contacts 190, via a line 191 to the readout strip 192 of the punch.

*Place limiting switching mechanism*

Referring to the circuit diagram, the place limiting switching mechanism comprises one section, generally designated 198 on Fig. 15a and two sections which are in effect, one section generally designated 199 (Fig. 15e). By setting the place setting switching machine on the 3 segment spot the left hand three columns leading out from the DDRO (Fig. 15c) will be connected for recording the quotient and three columns will be left for recording the remainder. By setting the mechanism on the 2 spot, there will be one less column for the quotient and an additional column for the remainder. Coming out from the switching mechanism 199 are a set of lines 200 which also include lines 200a which lead direct to DDRO. Such lines 200 are quotient lines. Coming out from the switching mechanism 199 are lines 201 which include lines 201a leading direct to the DDRO. Such lines 201 are remainder lines. The remainder lines lead direct to sockets at a plug board 202.

Referring now to the lines 200, these lines extend down to a set of pyramidical contacts 155b which are controlled by relay coils 155. Coils 155, it will be recalled, were selectively energized according to the shift of dividend on entry. Pyramidical contacts 155b are wired to another set of pyramidical contacts 154b, which contacts 154b are in turn under control of relay coil 154. 154 was energized according to the shift of the divisor upon entry. The wiring of pyramidical contacts 155b and 154b with respect to each other and with respect to the incoming lines 200 and the outgoing lines 203 which extend to the plug board 202, is such that a back shift is effected, that is, the quotient is shifted back to the right an amount equal to the shift to the left on dividend entry minus the shift to the left of divisor entry plus 1. The Figure 1 is obtained by using one less than the maximum or capacity (2): 2—1=1.

It will be understood that suitable plug connections are made at the sockets to which the lines 203 extend to provide for punching the quotient in the proper field on the card. In connection with the foregoing quotient shift back control provision must be made for providing for the punching of zero to the left and right of the quotient. This is provided for by dual control. Certain zeros are recorded under the control of a zero circuit 204 which leads into the 199 switching mechanism in the manner shown to control punching of zeros to the right of the quotient and to the left of the remainder. On account of the shift back, supplemental zero controls must be provided which is provided for by circuits 205a, 205b, 205c, and 205d, which extend to certain of the 155b and 154b contacts.

*Recording of quotient and remainder*

Before describing the recording operation, it may be explained that after a card has been sensed and passes the brushes 100, it is fed through the card handling section of the punch and ultimately such card passes to the R position in the punch, closing card lever contacts 193, energizing relay F and shifting relay contacts F—I to reverse position from that shown.

In starting up the machine, the usual punch racks (shown in the Cunningham and Oldenboom patents) are in extreme outer position and accordingly contacts P—I, P—3 and P—5 (Fig. 15g) are closed. With contacts P—5 closed, relay K will be energized and relay contacts K—2 will be in shifted position. Upon the shifting of relay contacts F—I and upon closure of cam contacts CC—I, a circuit will be established to the punch clutch magnet 194. This circuit is completed to the other side of the line through the punch contacts P—3 now closed and relay contacts K—2 now in shifted position. The energization of the punch clutch magnet 194 will cause closure of contacts 195 (Fig. 15g) which became latched closed in the customary manner. This will provide current supply for the punch motor. The card which has been previously read and which is in the punch unit in the R position is now advanced endwise through the punch unit to a position at which punching is to commence. The energization of relay coil U in the manner previously explained will have closed contacts U—17 (Fig. 15g) and upon closure of cam contacts CC—31, relay coil B becomes energized, closing stick contacts B—2. The holding circuit extends through the K—2 contacts which are now back in the position shown. With relay coil B energized, current flows through the punch escapement contacts 190, via a line 191, to the readout strip 192. With current thus supplied to the readout strip and with the brush of the readout standing on the first of the commutator spots at which punching is to commence the punching operation will start, there being a readout through one selection of the DDRO and an energization of the punch selector magnets 206 (Fig. 15c). The energization of relay coil B will also supply current to contacts 207 in the punch, which contacts are closed by interposer action to supply current to the punching magnet 208. Punching now proceeds and will continue until the complete quotient and remainder is read out and punched.

Punching will continue until all columns are punched and ultimately the card in the punch passes to beyond the last column position, closing contacts P—5 (Fig. 15g) and energizing relay coil K. The energization of K will shift contacts K—2 (Fig. 15e) to complete a circuit to the ejector magnet 209 in the punch and cause the card to be ejected.

The machine is now ready to reset the dividend and quotient accumulator and such reset is initiated in the following manner. With relay coil U energized in the manner previously explained, relay contacts U—22 (Fig. 15g) are closed, energizing relay coil AA. The stick circuit for A is through relay contacts AA—I which extends back to line through cam contacts FC—20. With relay coil AA energized, relay contacts AA—2 become closed and with relay coil K now energized, contacts K—3 become closed. Accordingly, with cam contacts CC—22 closed, the UU magnet for the dividend reset is energized. A stick circuit for UU is provided, through stick contacts UU—I, the circuit going back to line from cam contacts FC—20. With UU energized (see Fig. 15a), contacts UU—3—9 are shifted to reverse position from that shown. Contacts UU—2 (Fig. 15d) are also closed. The closure of contacts UU—2 affords current supply for emitter 18 and tens complementary impulses are emitted upon lines 172 and through the various transverse buses of the readouts to the direct readout section of the DD readout. From this section of the readout the impulses flow via the lines 210 (Figs. 15c and 15a), through the now shifted UU—3—8 and thence to the DD accumulator magnets. The transfer circuit during reset is broken by means of contacts UU—9 which are open during reset to cut off the supply of unwanted transfer impulses. After reset is completed and upon the brush of emitter 18 (Fig. 15d) encountering the extra spot, relay coil LL will be energized, relay contacts UU—10 being closed at this time.

Referring to Fig. 15g, energization of LL causes a momentary closure of contacts LL—1, energizing relay coil C. A stick circuit is provided for C through relay contacts C—2, the stick circuit extending back to line through cam contacts FC—2. With relay coil C energized (see Figs. 15g and 15e), a circuit is completed from the 134 side of the line through contacts F—1 now in the position shown through card feed clutch magnet 138, through cam contacts FC—3, through stop key contacts 139, through relay contacts C—1 now closed and through punch contacts P—1 now closed to the other side of the line. The energization of the card feed clutch magnet 138 initiates a new card feed and a new computation then proceeds on the following card.

As previously explained, initiating control for a new card feed comprises the relay LL (Fig. 15d) and contacts LL—1 (Fig. 15g). At the time when relay coil LL is energized, and before a new card feed is actually initiated, relay contacts LL—2 (Fig. 15a) open to break the stick circuit for coils 155 and 154.

*Improved place limiting control*

With previous place limiting mechanisms, if the place limiting switching mechanism was set to limit the operation to three orders, if the first order for which the mechanism was set contained a quotient amount of zero, the limiting mechanism would limit the operation at three orders including the zero. According to the improved construction, if the place limiting mechanism is set for three orders and the quotient in the first place is zero, the zero will be disregarded and a true three place quotient will be obtained, provided the machine carries the computation up three places beyond the first zero. This improvement in the place limiting mechanism is provided for by the construction shown in Figs. 15a and 15e, attention being directed particularly to the S control. Relay coil S, it will be recalled, became energized only if the quotient in the first place was a significant figure. With such coil energized, there is a shift of the relay contacts S—3—4 to reverse position from that shown and also a shift of relay contacts S—2 (Fig. 15a) to reverse position. With such contacts shifted, the place limiting control is effective from the very first column of the quotient which contains a significant figure amount. However, with such contacts unshifted, the place limiting control does not come into action for the first column, but comes into action relatively one column further to the right.

The place limiting control shown in Fig. 15a, also has a further function. It extends the computation for one further cycle in the event that the first quotient to the extreme left is zero. Reset is initiated upon closure of the circuit 184. After S is de-energized, the establishment of the reset circuit will be deferred one cycle with respect to what it would have been if the relay coil S was energized. This is brought about by the wiring of the place limiting mechanism, the shiftable S—2 contacts and the 2CS—13 contacts, the 3CS—13 and the 4CS—13 contacts.

*Cycle controller*

The typical computation shown in Fig. 13, previously explained, and for which the operation of the machine was traced, does not involve the operation of the cycle controller, but other problems may be handled by the machine wherein this cycle controller comes into operation. A typical simple problem can be taken such as 4193 divided by 41. Assuming no cycle controller control of the machine, this would be computed in three deducting cycles in the following manner:

$$\begin{array}{r} 102+11 \\ 41\overline{)4193} \\ 41\phantom{00} \\ \hline 009\phantom{0} \\ 000\phantom{0} \\ \hline 93 \\ 82 \\ \hline 11 \end{array}$$

However, by the use of the cycle controller as herein shown, one deducting cycle may be wholly eliminated in calculating the above problem so that the problem is calculated in two deducting cycles instead of three which would be required if there was no cycle controller. In utilizing the cycle controller, the above calculation is computed as follows:

$$\begin{array}{r} * \phantom{0000} \\ 102+11 \\ 41\overline{)4193'} \\ 41*\phantom{0} \\ \hline 0093' \\ 82 \\ \hline 11 \end{array}$$

In the above particular calculation after the first deduction, the machine senses the presence of the * zero just to the left of the 9 after the first deduction and with a zero occurring at this point the machine automatically brings about a column shift operation so that in place of bringing down a 9 alone, a 3 is also brought down from the dividend as shown by the 3 marked with a prime.

Referring now to the circuit diagram, the DDRO is provided with a supplemental readout section which will be generally designated 211. This section 211 is associated with the four right hand columns of the DD accumulator, it being remembered that the dividend is entered in this portion of the accumulator. This supplemental readout section has supplemental zero spots 212a, 213a, 214a and 215a. The brush for each order is adapted when the entry in that order of the receiving device is at zero, to connect spot 212a to an insulated segment section 212b pertaining to the same order. It will be understood that the 212b section is insulated from the usual common conducting segment and brush circuit is established to the b section from the a section only when the brush is at the zero position.

In the foregoing typical problem, after the first deduction of 41 has been made the brush and the related order of the readout will establish the brush circuit from 213a to 213b. The brush circuit will also be established from 212a to 212b. Under this condition current supply will be afforded at the time the CC—25 contacts close to the 212b segment and will flow over to the 212a segment and thence via the wire to the 213b section. At this section the brush will establish a circuit to 213a and from 213a a wire 216 extends to the 3Y magnet, to energize such 3Y magnet, 3Y once energized, is maintained energized by a stick circuit through contacts 3Y—3. The stick circuit going back to line through cam contacts CC—24. With 3Y energized in this manner, relay contacts 3Y—2 (Fig. 15a) become closed and with relay contacts 1CS—15 closed, which is their status at this stage of operation of the machine, a circuit will be established upon closure of cam contacts CC—26, through 1CS—15, 3Y—2 to the 3CS magnet.

It will be appreciated by this operation, that an intermediate column skip is eliminated, that is, there is no 2CS energization at all. Under this condition of operation, however, provision must be made for breaking the stick circuit for 1CS. The stick circuit for 1CS extends back through CS—1, contacts 2CS—14, cam contacts CC—18, contacts U—18, contacts UY—2, and through the 4Y—1 and 3Y—1 relay contacts. Inasmuch as the 3Y magnet is energized at this time the stick circuit just mentioned, will be broken and upon opening of the supplemental stick circuit through CC—19 and CS—2, 1CS will be deenergized.

It may be explained that the pickup circuit for magnet 3Y is from line 216, through 3Y contacts 3CS—11, contacts 4Y—3, contacts 4CS—11, contacts UY—1 to the 134 side of the line. The purpose of the 4Y—3 contacts and the 3CS—11 contacts is to prevent an unwanted cycle controller shift in cases where zeros appear. For example, assume that 000005 stands in the DD device. Under these conditions, current will flow from CC—25 in from 212b, thence to 212a, over to 213b by brush to 213a over to 214b by brush to 214a and out via line 217 to the 4Y magnet. Under this condition of operation it is not desired that the 3Y magnet also be energized. The energization of 4Y will break contacts 4Y—3 and interrupt both the pickup and stick circuit for 3Y so that 3Y cannot be maintained energized under this condition on operation. The purpose of the UY—1 contacts in the return circuit back to line is to prevent an unwanted set up of the cycle controller relays when the dividend receiving device is reset to zero.

The purpose of the 4CS—11 contacts and the 3CS—11 contacts in the cycle controller circuit is as follows: In the event that zeros appear to the left in the DD entry receiving device after a three order computation is completed, provision should be made to prevent an unwanted cycle controller set up, i. e. under this condition 3Y should not be energized. 3Y is prevented from being energized by the opening of relay contacts 3CS—11. If a four column computation is being calculated, provision should be made to prevent a set up of either the 3Y magnet or the 4Y magnet and this is effected by the opening of relay contacts 4CS—11. In short, the cycle controller must be allowed to operate at proper stages in the computation to keep from operating after such stages have been passed.

The timing diagrams, Figs. 14a and 14b show the cam contact timing for the various cams of the machine and also at the bottom of the diagram there are certain sequence legends delineating the various operations which occur in given machine cycles. With the timing diagram shown, as is customary with machines of this class, the timing is shown for running cycles and the extra cycles for starting up the machine from an empty condition are not delineated. Such starting up cycle would comprise two machine cycles preceding the first cycle delineated on Fig. 14a.

SUMMARY

The various operations of the machine can now be briefly summarized as follows:

Referring to Fig. 13, as each card is analyzed by the record reading means the divisor and dividend entries are read therefrom and a shift of the entry relations into the dividend accumulator is made so as to always place the dividend into the accumulator leaving two columns to the extreme left. A shift of the entry relations for the divisor may also be made, but in the typical calculation no such shift is required because the entire divisor capacity is utilized. The original entry of the divisor is made on the first reading cycle into the DR—1 accumulator, the DR—3 accumulator, the DR—7 accumulator and the DR—9 accumulator. The DR—1 accumulator is provided with readout devices from which the times 2 and the times 5 multiple of the divisor may be derived. On the second cycle, the times 2 multiple of the divisor is read out from the doubling readout associated with DR—1 and entered into DR—3, DR—4 and DR—9. On the following cycle the times 2 multiple of the divisor is entered again into DR—4 and during this same cycle the times 6 multiple of the divisor is read out from the doubling readout associated with DR—3 and entered into DR—7 and DR—9. At the conclusion of these preliminary cycles there will be available for readout from the readout devices associated with the various DR accumulators, all possible digital multiples of the divisor from 1 to 9 inclusive.

It may be explained that the DR—3 accumulator, and the DR—4 accumulator are provided with doubling readouts and the DR—7 and DR—9 accumulators are provided with straight readouts. DR—1 has a doubling and a times 5 readout.

The above are preliminary operations required for building up and rendering available representations of all multiples of the divisor. The readout devices associated with the various divisor accumulators constitute representing means for the various divisor multiples.

The next step in the operation of the machine is to select a comparison portion of the dividend standing on the dividend receiving device. After such selection is made this comparison portion of the dividend is concurrently compared with all of the possible or all of the digital multiples of the divisor. By the comparing operation the highest going multiple of the divisor is ascertained and under the control of the comparing means selection is made of such highest going multiple and of the corresponding quotient for entry into the dividend and quotient accumulator. After such selection, the complement of the selected highest going divisor multiple and the corresponding quotient amount is caused to be entered in the dividend and quotient accumulator. Following the complementary entry of the divisor multiple there is an entry of an elusive one and thereafter the machine automatically proceeds to a further comparing operation followed by a selection and entry of another complement of the divisor multiple and of the corresponding quotient. This procedure continues until the calculation is complete, at which time the quotient will be completely set up on the receiving means therefor and the remainder, if any, will likewise be left standing upon the dividend accumulator. The machine then proceeds to read out such quantities from this accumulator and the quotient and remainder result, if any, are punched back upon the record card from which the terms were originally derived.

The machine by the arrangement described, is adapted to materially save time over previous dividing machines. One entry per quotient place only is required, regardless of the number of times the divisor goes into the dividend comparing portion. Comparison of all digital multiples of the divisor with the dividend comparing portion is made concurrently and in one machine cycle thereby materially saving time over constructions wherein successive comparison operations might be required. The cycle controller arrangement also further saves time in that it eliminates a deducting cycle or cycles and comparing cycles in calculations where a zero or zeros in the dividend accumulator after a deducting operation are zero or zeros would produce zero or zeros in the quotient. In any calculation where such conditions appertain, the deducting and comparing cycles are completely eliminated.

What I claim is:

1. A number comparing means for a calculating machine for determining which one of a plurality of multi-denominational numbers of different orders of magnitude is the greatest that is contained in a comparison amount of multi-denominational form, including in combination, a source of differentially timed electrical impulses, said impulses according to their differential time of emission representing the various digits, set up impulse transmitting readout means from which sets of differentially timed impulses representative of a plurality of different numbers of different magnitude and the comparison amount may be derived, comparing means for comparing the comparison amount with all of the different numbers concurrently, said comparing means including sets of elements brought into action at differential times depending upon the differential time of receipt thereby of impulses representative of the comparison amount, other sets of elements brought into action at differential times depending upon the differential time of receipt thereby of impulses representing the other different numbers, and comparison result relays under the conjoint control of both of the foregoing sets of elements and disposed in sets each set related to each of the said respective different multi-denominational numbers, said comparison result relays indicating comparative magnitude of each of the numbers with respect to the comparison amount, and representing devices individual to said sets and controlled by certain of the comparison result relays for determining by their setup which one of the plurality of numbers is the greatest that is contained in the comparison amount.

2. A number comparing means for a calculating machine, including a cyclically operable impulse emitter providing sets of differentially timed impulses which by their differential time of emission represent the different digits, impulse transmitting means to transmit from said emitter impulses representative of a plurality of different numbers of different degrees of magnitude for comparison with a comparison number, impulse transmitting means for transmitting impulses representative of said comparison number, means for setting both of the last mentioned means so that impulses representative of different degrees of magnitude and the comparison number may be transmitted thereby, comparing means including sets of control elements brought into action by the electrical impulses at different times depending upon the differential time of receipt thereby of impulses whose time of transmission is determined by all of the foregoing impulse transmitting means for comparing the comparison number with all of the different numbers of different degrees of magnitude, comparison result devices for said comparing means controlled by the aforesaid sets of control elements for indicating the comparative magnitude of each of the numbers with respect to the comparison number, means for causing the impulses representative of the numbers to be compared to be transmitted concurrently during a single emitter cycle to said sets of control elements, and other representing control means controlled by certain of the aforesaid comparison result devices for setting up a control indicative of which of the different numbers is the largest that is contained in the comparison number.

3. A number comparing means for a calculating machine for determining which one of a plurality of multi-denominational numbers of different orders of magnitude is the greatest that is contained in a comparison amount of multi-denominational form, comprising in combination, a multi-denominational readout set according to the comparison number, a plurality of other multi-denominational readouts respectively set according to the plurality of numbers of different orders of magnitude, impulse emitting means for emitting differentially timed electrical impulses through all of the foregoing readouts, the said impulses by their differential time of emission representing the various digits and the aforesaid readouts upon such impulse emission transmitting sets of impulses corresponding to their settings and electromagnetic comparison effecting devices selectively set by differentially timed impulses according to the time and receipt thereby of impulses transmitted through the readout means, and electromagnetic comparison result means set by the foregoing electromagnetic comparison effecting means, certain of said comparison electromagnetic means having contact devices selectively set in accordance with the relative magnitude of the different plurality of numbers with respect to the comparison number.

4. A number comparing means for a calculating machine for determining which one of a plurality of multi-denominational numbers of different orders of magnitude is the greatest that is contained in a comparison number amount which may be of multi-denominational form, comprising in combination, impulse emitting means emitting differentially timed electrical impulses which by their time of emission are representative of different digits, a multi-denominational readout with elements set according to a comparison number for transmitting impulses according to the setting thereof, a plurality of other multi-denominational readouts with elements set according to a plurality of numbers of different orders of magnitude for transmitting impulses according to the settings thereof, electromagnetic comparing means having comparison result devices with control elements therefor selectively set and brought into action at differential times by the differentially timed electrical impulses which are transmitted from the emitter under the control of the comparison readout and the other readouts, and other representing control elements selectively set under the control of the comparison result devices of the electromagnetic comparing means in accordance with the relative magnitude of the different plurality of numbers with respect to the comparison number, and a plurality of relays which are selectively energized under control of said representing control elements.

5. A number comparer for comparing a multi-denominational comparison amount with a plurality of different multi-denominational comparable amounts of differing magnitude, comprising in combination, set up means on which the multi-denominational comparison amounts may be set, set up means on which each of the different multi-denominational comparable amounts may be set, means to emit differentially timed electrical impulses through all of the foregoing set up devices, said impulses by their differential time of emission representing the various digits, and said set up means selectively transmitting impulses according to their settings, electromagnetic circuit establishing devices controlled by received emitted impulses as selected by said set up means, comparison result devices controlled by said circuit establishing devices, sets of electromagnetic switching means controlled by the foregoing comparison result devices, one set of said switching means being provided for each different comparable amount and being controlled to assume one switching and circuit relation when a comparable amount is less than or equal to the comparison amount and another relation when a comparable amount is greater than the comparison amount, a test circuit including contacts controlled by said last mentioned switching means for the different comparable amounts and control devices selectively controlled according to the contacts established in the test circuit to indicate which of the plurality of comparable amounts is the greatest that is contained in the comparison amount.

6. A number comparer for comparing a multi-denominational comparison amount with a plurality of different multi-denominational comparable amounts of different degrees of magnitude, comprising a multi-denominational readout set according to a comparison amount, a plurality of other multi-denominational readouts, one readout for each of a plurality of different comparable amounts of different magnitude and set according to such amounts, impulse emitting means for emitting differentially timed electrical impulses through all of the said readouts, said impulses by their time of emission representing the various digits and the aforesaid readouts transmitting impulses according to their settings, a set of comparison amount relays energized by and according to the impulses which flow through the comparison amount readout, a set of supplemental comparison amount relays temporarily energized by and according to the impulses flowing through the comparison amount readout, a plurality of sets of comparable amount relays energized according to the impulses which flow through the related comparable amount readouts, a plurality of sets of impulse circuits which are selectively established under the conjoint control of all of the foregoing relays, sets of comparison result relays, each having coils in the aforesaid related sets of impulse circuits and also having contacts controlled by said coils, a certain relay of each set when energized under control of the selectively established impulse circuit indicating that the comparable amount relating to such set is greater than the comparison amount, and switching means controlled by said certain relays for designating which comparable amount is the greatest that is contained in the comparison amount.

7. The invention according to claim 6 wherein a test circuit is provided having contacts controlled by the relays in the impulse circuits and with control relays selectively singly energized according to the condition of the contacts and the test circuit.

8. A number comparer for comparing a multi-denominational comparison amount with a plurality of different multi-denominational comparable amounts of differing magnitude, comprising set up means upon which the multi-denominational comparison amount may be set, set up means on which each of the different multi-denominational comparable amounts may be set, means to emit differentially timed impulses through all of the foregoing set up devices, electromagnetic devices having elements controlled by received emitted impulses as selected by said set up means and having comparison result means controlled by said elements for indicating the comparative magnitude of each of the comparable amounts with respect to the comparison amount, sets of electromagnetic switching means controlled by the foregoing comparison result means, one set of said switching means being provided for each different comparable amount and being controlled by the comparison result means of said electromagnetic devices to assume one switching and circuit relation when a related comparable amount is less than or equal to the comparison amount and another relation when a comparable amount is greater than the comparison amount, a test circuit including contacts controlled by said last mentioned switching means for the different comparable amounts and control devices selectively controlled according to the contacts established in the test circuit to indicate which of the plurality of comparable amounts is the greatest that is contained in the comparison amount.

9. In a calculating machine including a series of settable devices, from which entries representative of a plurality of terms of a progression may be concurrently transmitted, amount receiving means for receiving an amount to be compared with all of the terms of such progression, and including in combination means to set up all of the foregoing settable devices and hold them set with the amounts of the different terms thereon during subsequent comparison, comparing means having a series of units receiving entries determined by each of all of the foregoing settable devices and entries determined by the amount receiving means for concurrently comparing for relative magnitude entries representative of the amount with entries representative of all of the terms of the progression to ascertain the highest value term of the progression which is itself not greater than the compared amount, means to bring about a concurrent comparison of all of said terms with the amount to be compared and in a single cycle of operation of the comparing means, said means comprising transmitting means for transmitting during a single transmitting cycle entries representative of the terms of the progression from each of the different settable devices and entries representative of the comparison amount to each of the units of the comparing means, control means corresponding to the different terms of the progression, and means controlled by the comparing means to select a control means which corresponds to the foregoing term ascertained by the comparing means.

JAMES W. BRYCE.

CERTIFICATE OF CORRECTION.

Patent No. 2,243,474. May 27, 1941.

JAMES W. BRYCE.

It is hereby certified that error appears in the printed specification of the above numbered patent requiring correction as follows: Page 9, second column, line 72, for "RDM—4" read --3DM—4--; page 18, first column, line 9, claim 4, strike out the word "control"; and that the said Letters Patent should be read with this correction therein that the same may conform to the record of the case in the Patent Office.

Signed and sealed this 8th day of July, A. D. 1941.

(Seal)

Henry Van Arsdale,
Acting Commissioner of Patents.